(12) United States Patent
Nelson et al.

(10) Patent No.: US 6,248,024 B1
(45) Date of Patent: Jun. 19, 2001

(54) COMPOSITE GOLF CLUB HEAD

(75) Inventors: Ronald H. Nelson; Dimitrije Milovich, both of Salt Lake City; Paul Nordstrom Clark, Sandy; Gregory Joseph Loughry, Salt Lake City, all of UT (US)

(73) Assignee: Radius Engineering, Inc., Salt Lake City, UT (US)

( * ) Notice: Subject to any disclaimer, the term of this patent is extended or adjusted under 35 U.S.C. 154(b) by 0 days.

(21) Appl. No.: 09/441,356

(22) Filed: Nov. 16, 1999

Related U.S. Application Data

(63) Continuation of application No. 08/839,110, filed on Apr. 23, 1997, now Pat. No. 5,985,197, and a continuation of application No. 08/865,493, filed on May 29, 1997, which is a continuation-in-part of application No. 08/839,110, filed on Apr. 23, 1997, now Pat. No. 5,985,197.

(51) Int. Cl.$^7$ .................................................. A63B 53/04
(52) U.S. Cl. .................. 473/324; 473/345; 473/347; 473/349
(58) Field of Search ....................... 473/324, 349, 473/345, 346, 350, 347, 348, 409, 131, 282

(56) References Cited

U.S. PATENT DOCUMENTS

| | | |
|---|---|---|
| 4,124,678 | 11/1978 | Stroupe . |
| 4,360,202 * | 11/1982 | Lo et al. . |
| 4,397,048 | 8/1983 | Brown et al. . |
| 4,575,447 | 3/1986 | Hariguchi . |
| 4,581,190 * | 4/1986 | Nagamoto et al. . |
| 4,759,893 | 7/1988 | Krauter . |
| 4,808,362 | 2/1989 | Freeman . |
| 4,828,781 | 5/1989 | Duplessis et al. . |
| 4,850,607 | 7/1989 | Trimble . |
| 4,889,355 | 12/1989 | Trimble . |
| 4,902,458 | 2/1990 | Trimble . |
| 4,931,247 | 6/1990 | Yeh . |
| 4,986,949 | 1/1991 | Trimble . |
| 5,076,601 | 12/1991 | Duplessis . |
| 5,143,665 | 9/1992 | Clubbs et al. . |
| 5,156,786 | 10/1992 | Monroe . |
| 5,207,964 | 5/1993 | Mauro . |
| 5,314,653 | 5/1994 | Haralambopoulos . |
| 5,318,742 | 6/1994 | You . |
| 5,328,176 | 7/1994 | Lo . |
| 5,350,556 | 9/1994 | Abe et al. . |
| 5,368,804 | 11/1994 | Hwang et al. . |
| 5,505,492 | 4/1996 | Nelson et al. . |
| 5,544,907 | 8/1996 | Lin et al. . |
| 5,624,519 | 4/1997 | Nelson et al. . |
| 5,803,476 | 9/1998 | Olson et al. . |
| 5,814,268 | 9/1998 | Banshelin et al. . |

FOREIGN PATENT DOCUMENTS

| | | |
|---|---|---|
| 2250443 | 6/1992 | (GB) . |
| 3034870 | 9/1976 | (JP) . |

* cited by examiner

Primary Examiner—Sebastiano Passaniti
(74) Attorney, Agent, or Firm—James L. Sonntag

(57) ABSTRACT

A composite golf-club head is disclosed with at least one complex three-dimensional molded composite part. The part has multiple interleaved plies of reinforcing fiber, and has a wall with an interleave ratio greater than about 30, preferably greater than about 100.

2 Claims, 17 Drawing Sheets

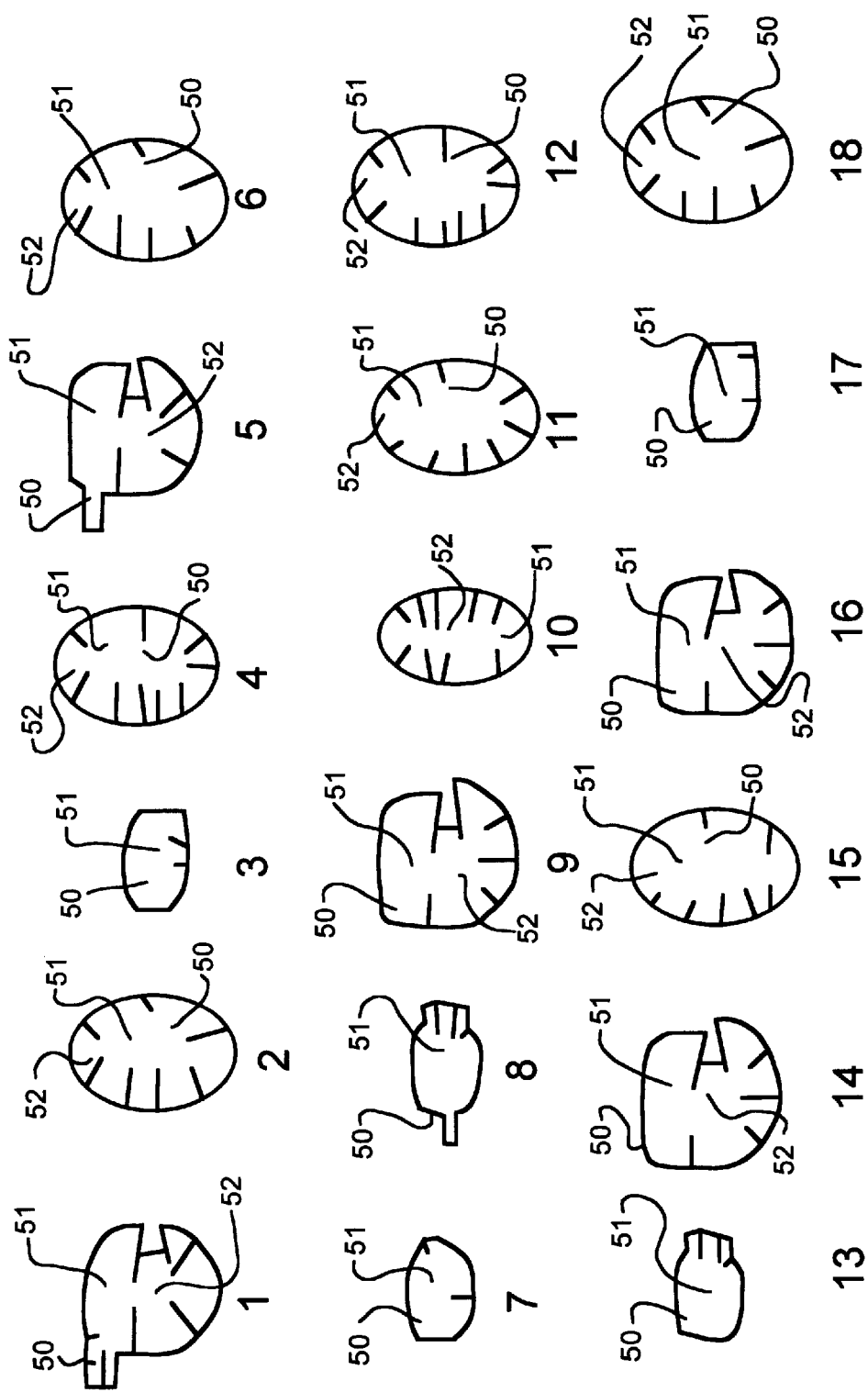
Fig. 4
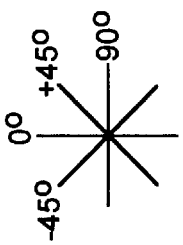

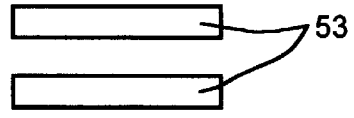 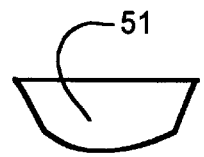 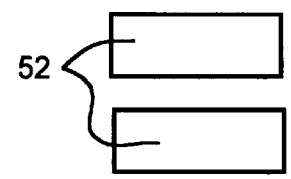
| 22 | 23 | 24 |
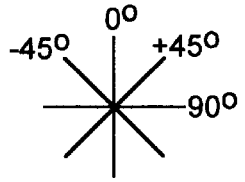
Fig. 5

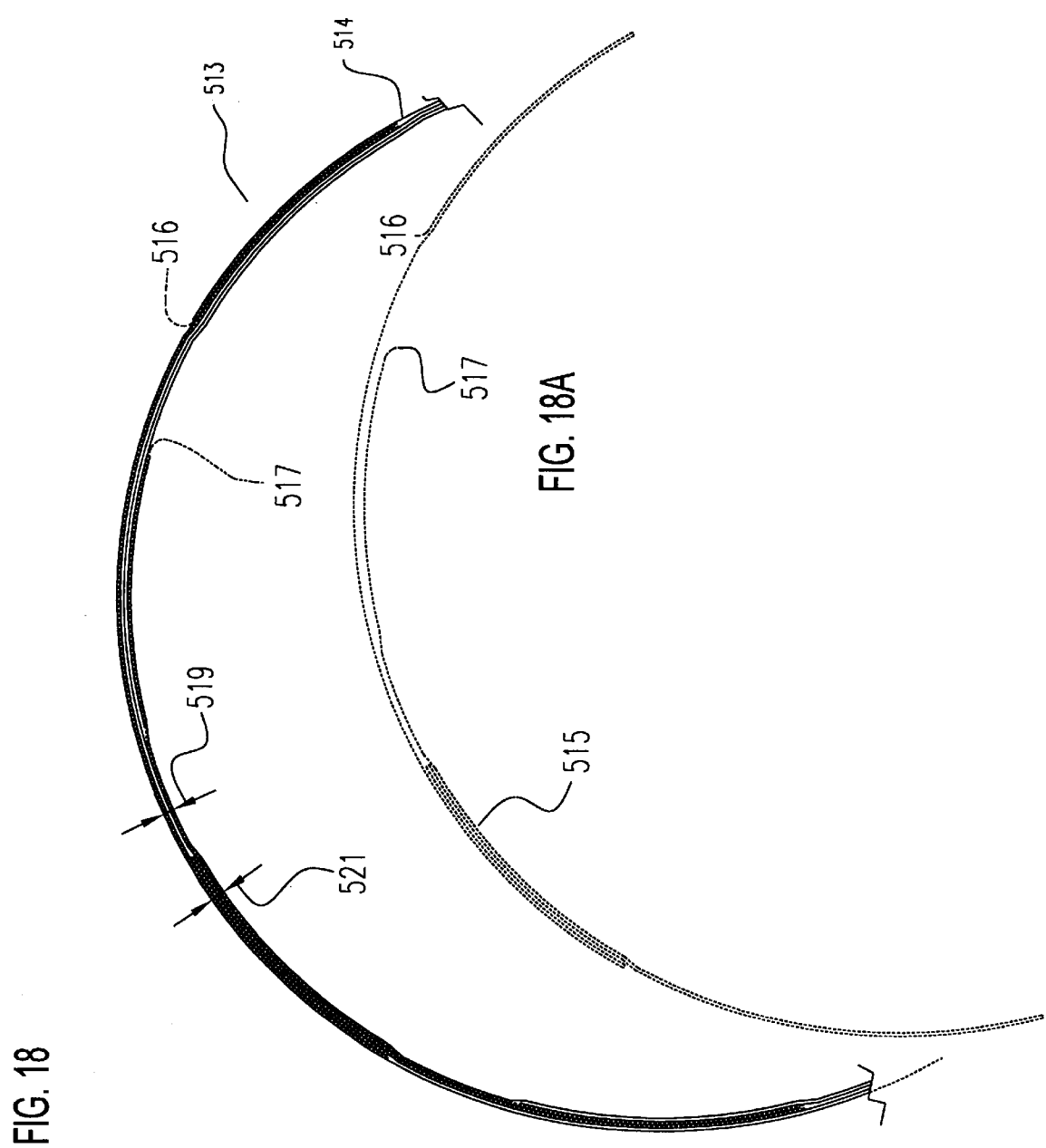

COMPOSITE GOLF CLUB HEAD

RELATED APPLICATIONS

This application is a continuation of copending U.S. patent applications Ser. No. 08/839,110, filed Apr. 23, 1997 now U.S. Pat. No. 5,985,197, and U.S. patent application Ser. No. 08/865,493 filed May 29, 1997, which is a continuation-in-part of Ser. No. 08/839,110, filed Apr. 23, 1997 now U.S. Pat. No. 5,985,197.

STATEMENT REGARDING FEDERALLY SPONSORED RESEARCH OR DEVELOPMENT (Not applicable)

FIELD OF THE INVENTION

This invention relates to the manufacture of golf club heads, particularly to those of the wood-or driver-type.

BACKGROUND ON GOLF CLUB HEAD PERFORMANCE

Wood-type heads are traditionally made from wood. However, with advances in materials, wood-type golf club heads have been made from various high-performance metals and other materials, such as titanium and fiber-reinforced plastics. The majority of fiber resin composite material club heads are compression molded around relatively rigid molding core. The majority of these club heads end up with a low quality composite, which is a result of difficulties in the process. To obtain a high quality composite in the club head using a rigid molding core, the core must be shaped very precisely and the uncured fiber resin material must be placed very precisely and systematically on the core to ensure that the proper amount of compaction occurs at all locations in the head.

Very few manufacturers can take the expense to do these steps, and produce a high quality composite in the head. The manufacturers producing the low quality composite heads may also use a quantity of uncured resin with a heat activated foaming agent around the foam core which expands with low pressure and ensure more or less full contact of the interior foam material to the outer composite material. The resulting composite material in such heads is of a very low quality having a high void content, low fiber content, and wrinkling of the reinforcing fibers.

In the few cases where the manufacturer has taken the time an expense to very accurately size and position all the materials going into the club head other problems are encountered. The fiber resin material must be carefully positioned one ply at a time which intermediate compaction steps taken after every few plies are applied. This is very time consuming and costly. Also the external shape design of such club heads is restricted to shapes which are more rounded in nature so the female tool applies a more inform pressure to the exterior of the part. This imposes fairly serious shape design constraints, in fact most high performance club heads do not have these rounded shapes.

The club heads produced by the present invention do not suffer from these limitations. The high pressures exerted by the internal pressure bladder produce a very high quality, low void content, high fiber volume laminate, better than the best costly compression molded club heads. The heads are also hollow which is a major benefit. Since the high compaction pressures are produced by the interior bladder, and not dependent on extremely precise sizing and placement of the uncured fiber resin material, the time and cost associated with laying up the uncured fiber resin material is reduced substantially. Also, since the compaction pressures are not dependent on the sizing and interaction of foam cores, the uncured fiber resin material, and the inside of the female tool, the club heads of the present invention have essentially no limitations in their shape.

A club head used with a particular shaft in a particular golf club type (i.e. a "driver" which is also known as a "number 1 wood", "number 2 wood", etc.) will have an optimum weight chosen to maximize the playability of the club. Generally this can be stated as a particular club type having a given shaft length will have a predetermined set of mass properties to obtain an optimal configuration for playability and performance. These mass properties are the balance point and swing weight, i.e. the center of gravity and mass moments of inertia. Therefore a given club head will have a set weight in its optimal design, not the lowest weight possible. Typically, for example, a "driver" ("number 1 wood") will have a club head weight of about 200 gr.

In addition, generally for most golfers using a given golf club type, larger club heads are more desirable and work better than smaller club heads, especially for wood type heads. This benefit can be understood in the simplest sense by realizing that it is easier to hit the ball, i.e. not miss hitting it, with a larger club head. More precisely, it can be understood that a larger club head will generally have larger mass moments of inertia, and thus will be more stable and less prone to rotate on off center hits during the ball impact event. Sometimes golf club heads are said to have "sweet spots" on the club head face. These areas are dependent on the mass properties of the club head, and also on the elastic properties of face. In general the larger the club face size the larger the "sweet spot" which makes it easier for a golfer to strike the ball in this "sweet spot".

Given these design constraints on the club head, intelligently designed composite club heads do not use composite materials to decrease the club head weight, but to decrease the amount of material needed to provide the necessary strength and stiffness in the head. This has been termed herein "reducing the minimum structural weight."

Once the minimum amount of composite material needed for strength and stiffness has been obtained, additional material is then added to the head, either composite material or metallic materials, to bring the head weight up to the desired optimal weight. Reducing the minimum structural weight maximizes the flexibility for location of this additional weight. The placement and location of the weight inside the club head have a very pronounced effect on the playability and performance of the club head. As mentioned, the final mass properties of the weighted club head, primarily the center of gravity and mass moments of inertia, have a large impact on the overall club performance. Reducing the minimum structural weight maximizes the tailoring which can be accomplished on mass properties, which improves club playability.

As an example, a lightweight titanium head might have 90% of its weight located as needed for structural performance. That means that 20 grams out of the 200 gram weight might be available to place where needed for mass properties. An equivalent composite carbon fiber epoxy head of the present invention would have 65% of its weight located as needed for structural performance, allowing 70 grams to be placed for optimal mass properties.

As mentioned, larger club head size generally improves playability. Club head size is usually termed and measured as club head volume. The lower density of composite materials also allows for the manufacture of larger club heads which have better playability. The higher strength of club heads of the present invention also allow even larger club head volumes than previous lower strength composite club heads. As will become obvious in the detailed description of this inventions the method of the present invention produces high quality composite heads, in part because there is no one location in the head where a several ply terminations occur simultaneously.

The construction methods disclosed herein produce very high performance composite club heads. Further refinement of all the various manufacturing steps for use in high volume production is anticipated and it will be recognized by those skilled in the art that many variations are possible without departing from the scope and spirit of this invention.

BACKGROUND OF THE INVENTION

One of the methods for forming fiber-reinforced composite club heads involves molding around a relatively rigid molding core, which may or may not be removed after cure. An example of such a method is disclosed in U.S. Pat. No. 4,581,190. to Nagamoto et al. Nagamoto et al. discloses process for making a club head where a fibrous bag of reinforcing fiber is placed over a rigid molding core. The fibrous bag, which in the patent drawings appears to resemble a paper sack, is impregnated with plastic. The plastic is cured by applying heat under external pressure, which presses the impregnated bag against the core during molding.

Nagamoto et al. discloses another method conceptually and describes it without any detail or drawings. In this method, the loosely arranged bag of fibrous reinforcing material is placed around a second bag of impervious material (vinyl chloride). Both bags are placed into a mold and the impervious bag is inflated by introducing air vapor or liquid (e.g. oil) under pressure to press the reinforcing materials bag against the wall of the cavity of the mold.

These Nagamoto et al. patent methods illustrate two approaches in the prior art for making club heads. The first approach involves forming impregnated fibers around a rigid molding core and curing the fibers by externally pressing the impregnated fibers against the rigid core. This class of methods has several disadvantages, the main one being the molding core usually remains in the interior of the club after molding. Nagamoto et al. mentions this "inconvenience" on line 35 column 4. The molding core is usually left in the head as permanent component of the head, or can sometimes be removed. To remove the core, it has been proposed to use various removable materials for the core such as various lost-mold compounds, low-melting salts or metals, waxes, and plastic foams that can be dissolved by a solvent. The difficulty is that the core material must be strong and heat-resistant to withstand the molding conditions, since the core must support the cure temperature and the compression of the fiber bag against the core. However, strength and heat resistance are counter to properties that allow easy removal of the core. Consequently, the core materials that have high temperature and strength properties for molding are either expensive, are hazardous materials and/or difficult to handle (such as low-temperature-melting salts or metals), or must be removed by toxic solvents. In addition, for many core materials the molding pressure and temperature are limited by the physical properties of the core. For example, polystyrene foam cannot withstand higher temperature and higher pressures, which precludes its use in making high-compression composite materials. For high-pressure compression, only the higher strength core materials can be used, which usually bring about increased problems of safety, cost, and difficulty in handling or removal. The higher strength core materials, such as wax and low melt metal alloys, have substantial thermal mass, generally on the order of several times the composite material being molded. This high thermal mass is also on the inside of the head, with almost all composite materials having relatively high thermal resistance through the thickness of the laminate. The combination of these effects effectively lengthens the molding times considerably, because of the extra time required to heat the entire head and core structure. Decreasing molding cycle time by a factor of 2 or 4 would have a dramatic effect on the cost effectiveness and economic feasibility of a head manufacturing process.

The second approach in the Nagamoto et al. patent (disclosed at col. 4, lines 35 to 53) describes the second general approach for forming composite material heads, and avoids the problem of a core remaining in the molded article by eliminating the molding core. The process involves placing a bag of loosely arranged impregnated fibers around an impervious bag of vinyl chloride, which is inflated to press the impregnated fibers against the cavity walls in the mold. Since there is no molding core around which to place the fiber bag, the bag of fibers and inflatable bag are only loosely placed together. When the bag is inflated, there is large amount of movement of the fibers as the bag expands and moves the fibers against the cavity walls, and the fibers can not be located with much precision. This causes the club head to have unpredictable fiber orientations because of the imprecision of the final fiber placement. In addition, the use of plies over only a portion of the club head or plies in a specific fiber orientation is precluded, because the reinforcing fibers must be in the form of a bag. It would be very difficult or nearly impossible, for example, to optimize the design of the club head by placement of one or more plies in selected portions of the club head to increase strength and stiffness in the portion. During expansion of the impervious bag, the surrounding fiber bag would tend to move significantly from their original position, and a specific placement of the fibers would be difficult due to the looseness of the initial placement of the bag.

The second Nagamoto et al. process does not describe any means for introducing a pressurized fluid or gas into the bag, or specific means for constructing the impervious bag and the raw material form used, or the means for attaching a pressure delivery source to the bag inside the mold, or the anticipated or required temperature and pressure capability of the impervious bag system. There is no indication of pressure levels that could be applied to a vinyl chloride impervious bag, and what molding temperatures could be. If the temperature increase of the gas initially in the bag provides the pressure, which would be the simplest approach and is disclosed by U.S. Pat. No. 4,575,447 to Hariguchi line 65, column 1, there would several limitations. The pressures would be restricted to very low compaction pressures, and such pressures would not be independently controllable of the mold/part temperature.

An alternate process to the Nagamoto et al. inflatable bag molding process is disclosed in U.S. Pat. No. 4,575,447 to Hariguchi. In the Hariguchi process an impervious bag is manufactured as a hollow core of a material that is rigid at room temperature. The rigid core is shaped similar to the final shape. Impregnated fibers are placed around the hollow core and placed in a female mold. During molding the core softens under heat of the molding, which then can be expanded by pressurizing the core. This presses the impregnated fibers against the mold. The pressure inside the core can be provided by thermal expansion of air sealed inside the head, or by introduction of a pressurized medium. The problem with this approach is that the hollow core is limited to rigid materials that can be softened and inflated during molding. In addition, the softened hollow core becomes attached and incorporated into the interior of the club head. Thus, the inflatable core remains as a permanent part of the club head. The thermoplastic core, which for a material like polyethylene, would be limited to low pressures at the cure temperatures that are typically used in composite sporting goods manufacturing. Since the process relies on a rigid material that softens at a particular temperature, the entire process would have to be designed around this temperature, regardless of its suitability for processing, i.e. the curing of the composite. Application of pressure to the rigid core below the softening temperature would not supply any compaction pressure to the composite because of the core's rigidity. It is desirable to apply compaction pressure over a wide range of temperatures during the cure, even at near room temperature conditions when the mold is just closed. If thermal expansion of the air trapped inside the core is used for pressure, the process would be limited to relatively low pressures from the core.

In summary, prior-art systems, suffer from one or more of the following problems:

(1) Significant residue remains in the interior of the molded club, either
   (a) an entire molding core that is hard to remove, or is otherwise a toxic or difficult material that requires special handling, or
   (b) an inflatable bag or core remains and becomes incorporated with the club head material and cannot be removed;
(2) Low molding pressures are used because of the inherent weakness of the inflatable materials being used and their inability to retain high pressure under the high molding temperatures. Weakness in the finished club head results from low compaction of the fibers produced by low molding pressures, which cause a lower fraction of structural fiber in the composite part relative to the resin;
(3) Weaknesses and unpredictable wall thicknesses at critical locations occur in the final molded part due to movement of the plies during molding (See, for example, U.S. Pat. No. 4,575,447 to Hariguchi line 45, column 1) or inaccurate placement of plies.
(4) The processing pressure is apparently dependent upon the temperature for some of the processes. This leads to less than optimal processing conditions.

SUMMARY OF THE INVENTION

An embodiment of the invention is golf-club head with a high interleave ratio. The golf club heads of the invention are made by a process which has the advantages of both a relatively rigid molding core processes and an inflatable bag process, but avoids major disadvantages of each. The initial preform of uncured impregnated fiber is formed around a mandrel core or forming core surrounded by an inflatable bladder, so that the preform is dimensioned near to the final shape and does not require significant movement of fibers to conform to a mold cavity. The mandrel core is used only for formation of the uncured preform of uncured resin composite, and it is not used in the actual molding process. Therefore, the strength and heat resistance of the mandrel core is not critical.

Before the impregnated fibers are placed around a core, the core is placed in an inflatable, fluid impervious bladder. During molding, the bladder is inflated to press the impregnated fibers against female tooling. Since the core does not have to withstand the pressure and temperature molding conditions, it may be made of materials that are structurally weak and unable to withstand elevated molding pressures and temperatures. This allows the use of materials that are completely unsuitable as rigid molding cores in prior-art systems. Thus, a material, such as starch foam, that can be easily removed by dissolving with a readily available and non-toxic solvent, water, can used. Previously such materials have not been used in composite processes because they do not have the strength to withstand molding conditions. However, since the mandrel core is only used for laying up the part, it does not function as a support or molding core during the compressing and heating during molding. For this reason, a molding core material may be chosen that may or may not withstand the high temperature and pressure conditions of molding.

After molding, in the preferred embodiment of the invention, the core can then be easily removed merely by injecting water into the inflation bladder inside the molded part to disintegrate or dissolve the core sufficiently to allow it to be washed out and allow subsequent removal of the bladder. No special handling or disposal is required, which would be the case for removal of molding cores of liquid salts or plastics dissolvable only in organic solvents. The bladder is made of a heat resistant plastic that does not soften or react with the interior of the interior of the molding part. Thus, it can become separated therefrom and be easily removed, along with any small residue of the mandrel core that may be within bladder.

Additionally, in the preferred embodiment of this invention, the bladder consists of a thin film, that consists of only a small volume of material. The film bladder can then be removed by pulling out of a small opening in the molded part. Additionally the thin film bladder itself can be a soluble plastic, preferably water soluble, such as poly vinyl alcohol (PVA) film. The use of easily soluble bladder films is advantageous where extremely small openings are used for inflation during molding and removal subsequently. Soluble films are also used if molding of complex features on the inside of the part might inhibit removal of the bladder. Such complexities might involve cocured features inside the head.

BRIEF DESCRIPTION OF THE DRAWINGS

FIGS. 4 is a plan view of a set of plies of resin impregnated carbon fiber for placement around an assembly as in FIG. 3.

FIG. 5 is a plan view of porous carbon mats used in manufacture of the club head.

FIGS. 18 and 18a are a schematic cross-sections of a portion of part of the invention illustrating the high interleave ratio of the part.

PARTS LIST

Figure 1:
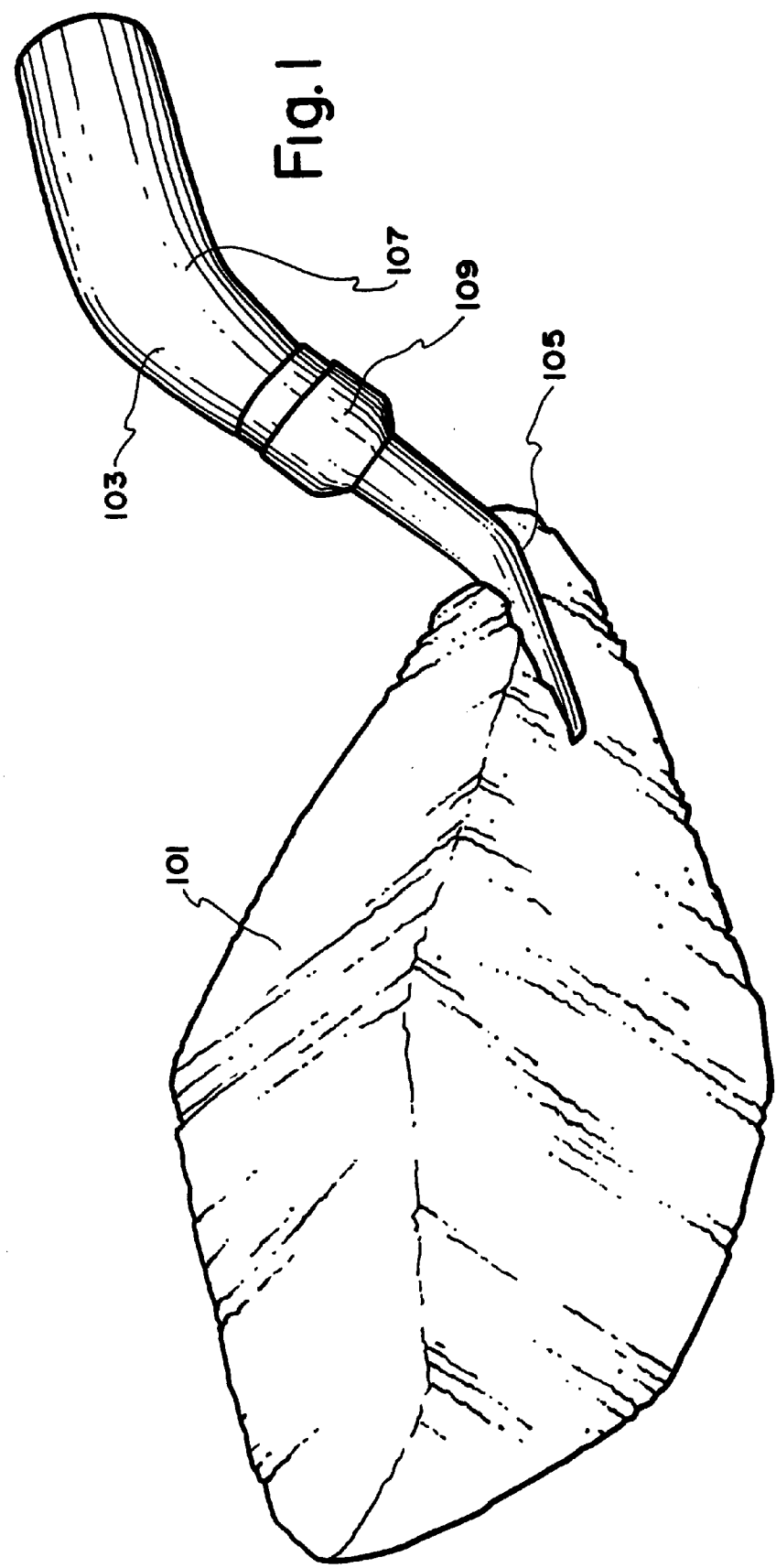
FIG. 1 is a perspective view of a soluble mandrel core used in the process of the invention combined with an incomplete inflation fitting used later in the process for bladder inflation.

A list of the part numbers used in the figures with a brief description is included below:

| Part Number | Description |
|---|---|
| 50 | designates portions of the preforms that correspond to the hosel |
| 51 | designates portions of the preforms that correspond to the face |
| 52 | designates portions of the preforms that correspond to the sole |
| 53 | designates portions of the plies that correspond to the crown |
| 101 | foam mandrel core |
| 103 | incomplete inflation fitting |
| 104 | completed inflation fitting |

-continued

| Part Number | Description |
|---|---|
| 105 | rigid tube for inflation fitting |
| 107 | silicon rubber tubular member for inflation fitting |
| 109A | inner self vulcanizing rubber tape for inflation fitting |
| 109B | outer self vulcanizing rubber tape for inflation fitting |
| 111 | bladder |
| 115A, B, C | first three seals on heat sealable film bladder |
| 115D | final bladder seal |
| 117 | bladder inflation fitting opening |
| 119 | mandrel core insertion edge of bladder |
| 123 | vacuum line and valve for part lay up |
| 125 | core/inflation-fitting/bladder assembly |
| 127 | prepreg fiber resin material plies |
| 129 | unimpregnated carbon felt mats |
| 131 | wrapped club head assembly |
| 132 | mold heating platen |
| 133 | female mold |
| 134 | mold match pin |
| 135 | top mold half of female mold |
| 136 | mold handle |
| 137 | bottom mold half of female mold |
| 138 | heating platen insulator |
| 139 | mold thermocouple connection |
| 141 | mold cooling lines |
| 143 | mold tubular barbed fitting for bladder inflation fitting |
| 144 | mold bladder inflation line |
| 145 | tool prepreg plies |
| 146 | mold "O" ring vacuum groove |
| 147 | removable mold insert |
| 150 | mold vacuum line |
| 151 | molded part prior to trimming or drilling |
| 153 | top hosel hole in club head |
| 155 | hollow club head interior |
| 157 | golf club shaft |
| 159 | optional interior club head shaft attachment sleeve |
| 161 | club head weighting insert |
| 163 | bottom hosel hole in the sole of club head |
| 200 | mold temperature during molding |
| 201 | bladder pressure during molding |
| 202 | bladder pressure pulsing during molding |
| 203 | mold cavity vacuum during molding |
| 205 | water injection fitting |
| 206 | finished and trimmed club head |
| 501 | prior-art composite part |
| 503 | shortest path through prior-art joint |
| 509 | prior-art lapped joint |
| 511 | thickness at prior-art joint |
| 513 | interleaved part of the invention |
| 514 | laminate in part of the invention |
| 515 | path through part of the invention |
| 516 | start of path 515 |
| 517 | end of path 515 |
| 521 | thickness of part of the invention at thicker point |
| 523 | thickness of part of the invention at thinner point |

DETAILED DESCRIPTION OF THE INVENTION

A mandrel core is formed from a soluble material that is in the general shape of final club head, but smaller to accommodate the bladder and the prepreg materials, and allow insertion of the assembly of the shape, bladder and prepreg into the mold. While the dimensions of the shape are not critical, it is preferred to have the dimensions as large as practical to minimize movement of the prepreg material during inflation of the bladder in the molding process.

The core may be formed by any suitable method, such as by molding, or formed from a larger piece using, for example, cutting, sanding, carving, sawing, and the like. When the material of the shape is the preferred steam-blown starch, the shape is preferably formed from a large block using conventional wood shaping methods.

The core is of a soluble material that is preferably water soluble, preferably a starch. Since the shape is not required in the actual molding process, it is not necessary that it maintain its integrity in the heat and pressure of the molding environment. Therefore, inexpensive readily available materials are preferred. It is necessary that the solid material be sufficiently soluble to allow its removal after molding. In addition, the core material should not form a material during the molding process that is difficult or impossible to remove. For example, some blown plastic materials, such as styrene foam, while ordinarily very soluble in an organic solvent, collapses into a dense difficult to dissolve solid pea at the molding temperatures. A material should be chosen that does not leave residue in the interior of the finished molded golf-club head that would prevent or materially inhibit the removal of the bladder. Preferably the material when dissolved leaves no solid residue, but if a solid residue does remain it should be fine enough to not significantly interfere with bladder removal.

Water soluble materials are preferred as water is readily available and easy to dispose of. In addition, non-toxic, and non-hazardous materials and processes are preferred for personnel safety and for trouble-free and economical disposal of the wash solution. Other materials that are soluble or react in a sufficient manner for the solid to disintegrate enough to allow removal of the bladder are contemplated, but are generally not preferred, because the solvents required, such as acids and organic liquids, are often expensive, require expensive apparatus for recovery or fume control, etc. In general, any core material that can be made soluble or disintegrated to allow removal of the bladder from the final molded part is contemplated. This includes materials that are fluid removable, i.e., can be dissolved, or reacted by any suitable fluid, gas or liquid, that is injected into the bladder after the part is molded.

In summary, the preferred material is readily soluble in water, is not a hazardous or unsafe material, presents no extensive waste disposal problem, and leaves essentially no residue in the bladder interior that would interfere with easy removal of the bladder from the molded part. Materials that have been found suitable are starch materials, particularly steam blown starch foams. These materials are available under the name ECO-FOAM™ from American Excelsior Co., 8500 Avenue H, East Arlington, Tex. The material uses Hylon VII starch available from National Starch and Chemical Company, 10 Finderne Ave., Bridgewater, N.J.

After the shape is formed, it is surrounded by a flexible bladder. The flexible bladder may be of any suitable material that allows placement of the shape within the bladder, is flexible enough to generally conform to the shape, and is capable of being inflated and maintaining an a high internal pressure during the molding process. Preferred materials are heat-resistant thermoplastics. A suitable film of this type (1 mil thickness) is available from Airtech Advanced Materials Group, 2542 East Del Arno Blvd, Carson, Calif. 90749-6207, under the name of Wrightlon 4500 Release Film. These halohydrocarbon-based films are particularly suitable because of its elasticity, strength, and ease of release from epoxy resins.

Other suitable materials, include but are not limited to water soluble films, such as PVA and PVAL films. These films are heat sealable films formed using polyvinyl alcohol. A suitable water soluble PVAL film (2 mil thickness) is manufactured by Aicello North America Incorporated, North Vancouver, B.C., Canada and available from Mitsui Plastics, Inc., 11 Martine Ave, White Plains, N.Y. 10606 under the name Solublon KA™. Non heat sealable materials are also contemplated, such as Silicone and Latex materials.

The bladder is preferably formed in a conventional manner for the material from which it is fabricated. For heat-scalable materials, a two-panel "sandwich bag" can be formed from separate sheets or a tube by sealing the edges of the bag using a heated sealing bar. The bladder may be also be formed from other suitable methods, such as molding, dipping and curing around a mandrel, and the like, as long as a suitable bladder with the necessary properties can be formed. The bladder is preferably shaped to approximate the shape of the core. The bladder also has an opening through which the bladder may be inflated, which may or may not be an opening through which the core in inserted into the bladder. Also inserted into the bladder is an inflation fitting around which the inflation opening of the bladder is sealed and through which the bladder is inflated. In a preferred method, the bladder is formed by sealing edges of two thermoplastic plies, except for one long edge which is left open for insertion of the core and inflation fitting and an opening for the inflation fitting. After insertion of the core and inflation fitting through the unsealed long edge, that edge is heat sealed. In this way bladder is formed to more easily conform to the core and inflation fitting as well as to the mold interior without excessive folding.

The inflation fitting is generally tubular and configured to allow sealing of the bladder around the fitting so that the bladder can retain pressure. The inflation fitting may be any suitable material, for example, a metal tube with a silicon jacket to allow the bladder to be sealed to the inflation fitting. The inflation fitting may also function as a mandrel over which plies for the hosel of club head are formed. The hole in the final molded part through which the inflation fitting formerly passed then corresponds to the mounting hole for a golf club shaft. Alternately, the hosel may be formed around part of the foam core and the inflation fitting be placed elsewhere. The hole in the final part for the inflation fitting may then be plugged by any suitable means, such as by curing a fiber composition material in the hole, or it may function to mount weights, striking surfaces, plaques or labels, or the like. A hole may also be disposed in the bottom sole of the head such that when the head is mounted the shaft extends through the hosel, though the club head and out through the hole to reinforce the attachment of the shaft.

SPECIFIC EXAMPLE OF PREFERRED EMBODIMENT SHOWN IN DRAWINGS

As a specific example, referring to FIG. 1, which shows a foam core 101 with an incomplete inflation fitting 103 pushed into the foam core. The inflation fitting is placed to also function as a mandrel around which plies for the club head hosel are placed. The incomplete inflation fitting 103 comprises a copper tube 105 and silicon rubber tubular member 107 which is fixed to the copper tube with the inner self vulcanizing rubber tape 109A.

Figure 2:
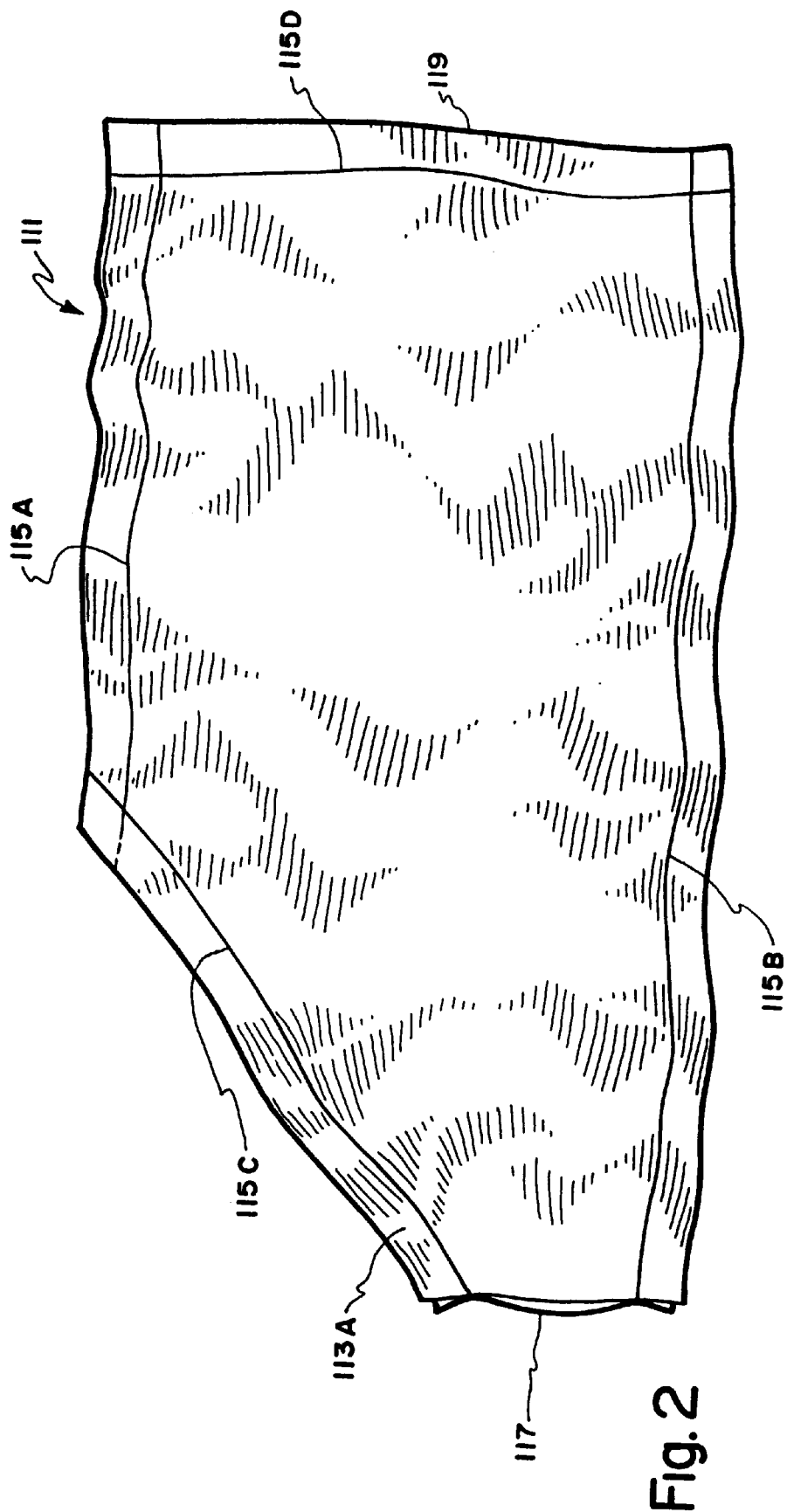
FIG. 2 is a schematic of a inflatable flexible bladder used in the process of the invention.
Figure 3:
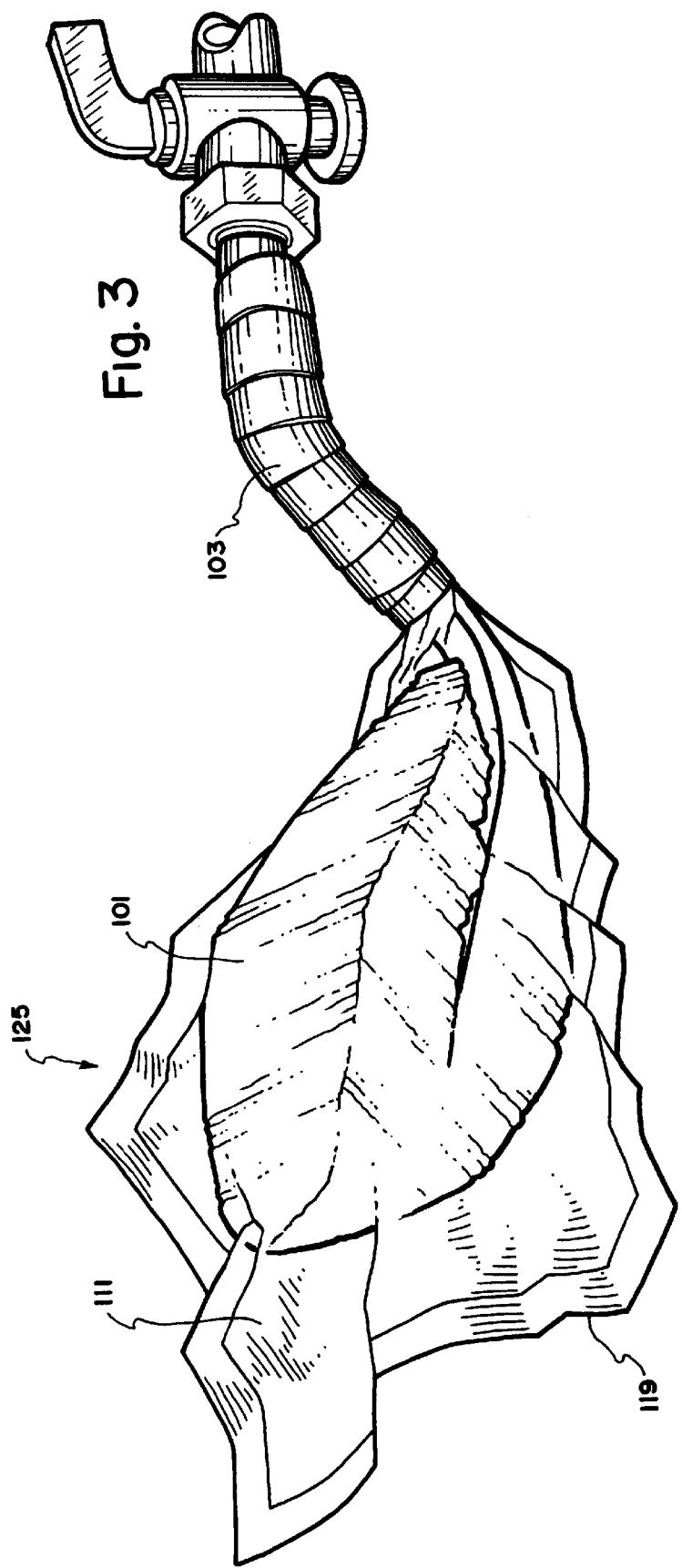
FIG. 3 is a perspective view of a core with inflation fitting as in FIG. 1 placed in a bladder as in FIG. 2 with a fitting for vacuum processing.

Referring to FIG. 2, a bladder 111 is formed by heat-sealing two plies of a heat sealable film with seals 115A, 115B, 115C. An opening 117 is provided for the inflation fitting, and an edge 119 (opposite the opening) is left unsealed until after insertion of the assembled inflation fitting and core, after which it is sealed with the final bladder seal 115D. FIG. 3 shows the core 101 with the completed inflation fitting 104 in the bladder 111 with the insertion edge 119 sealed. The bladder is sealed to the completed inflation fitting 104 by wrapping with the outer self vulcanizing rubber tape 109B (available from MOCAP, 10963 Lin-Valle Drive, St. Louis, Mo.) around the bladder where it overlays the silicon rubber tubular member 107. The silicone rubber material for the silicone member is Manufactured by Dow Corning, Midland, Mich. The inner surface of the bladder 111 at the opening 117 seals to the outside surface of the silicone member 107 during cure because the female mold 133 compresses the completed bladder inflation fitting 104, when the mold 133 is closed. The inside surface of silicone member 107 also seals against the barbed fitting 143 when the mold 133 is closed. The outer wrap of self vulcanizing tape 109B protects the thin film bladder and keeps it in the bladder inflation cavity of the tool without pinching between the mold halves 133 when the mold is closed. It has also been found that heat shrinkable polymer tubing will also serve this function.

The film bladder 111 shown in FIG. 2 was constructed from flat sheets of thermoplastic film which is heat sealed together. The resultant bladder is made considerably oversize. Alternatively, the same thermoplastic film has been vacuum formed to form a premade three dimensional shape which has its edges located on a planar surface. These vacuum formed pieces are then heat sealed on the planar surface edges after the foam mandrel core 101 has been inserted. The resultant bladders are highly three dimensional in their free state and their shape more closely follows the foam mandrel core 101. The foam mandrel core 101 is then also shaped more closely to follow the interior finished part shape, and the lay up process is simplified, for example a vacuum is not needed to pull a greatly oversized bladder 111 down on the foam mandrel core 101.

After the shape is suitably contained within the bladder 111 and the bladder sealed around the incomplete inflation fitting 103 thereby the completed inflation fitting 104. Air is drawn out of the interior of the bladder 111 by fixing a vacuum line and valve 123 to the completed inflation fitting 104. This allows the bladder 111 to conform with the shape of the core 101. The core/inflation fitting/bladder assembly 125 is then covered with one or more plies or layers of reinforcing fiber impregnated with a curable resin, commonly referred to in the industry as prepreg. Prepreg is available from many sources with variety of resins and reinforcing fibers. In most applications, there are several plies, with placement of the plies and their fiber orientation according to design requirements of the club head. The fibers may be organic, or organically derived carbon or graphite fibers, or any other high strength/high modulus fibers.

FIG. 4 is a plan view showing an a exemplary set of prepreg preforms. The preforms are all composed of laminates of unidirectional fiber prepreg and are fitted to be formed around a core. The numerical labels correspond to the order in which they are placed on the mandrel. The labels 50, 51, and 52 designate portions of the preforms that correspond to the hosel, face, and sole respectively. Suitable unidirectional carbon prepreg material is manufactured by Danutec Werkstoff GesmnH, Unz, Austria, and is available from Ciba Composites, 5115 East La Palma Ave., Anaheim, Calif. 92807 under the name Strafil C-M30SC-EP 1-130™. In Table I below is shown for items 1 to 18 a description of each of the prepreg preforms including the number identifying the preform which is also the preforms order of placement onto the mandrel. The table also describes the orientations of the fibers in each ply of the preform as well as the form of the fibers composing the preform. In general the preforms are sized to cover about 60% of the total club head surface area. The darts, shown as slits, reduce amount of wrinkling of prepreg material as it is placed on the core/inflation fitting/bladder assembly 125. However some small wrinkles are usually produced during wrapping and will disappear during the preform expansion and compaction in the molding process. The preforms are designed such that the number of ply terminations at any one location are minimized.

TABLE I

| Number | Description | Orientation | Material |
|---|---|---|---|
| 1 | Face-Sole | −45/+45 | Unidirectional |
| 2 | Face-Crown | 0/90 | Unidirectional |
| 3 | Face | 0/0/0/0 | Unidirectional |
| 4 | Face-Crown | −45/+45 | Unidirectional |
| 5 | Face-Sole | 0/90 | Unidirectional |
| 6 | Face-Crown | 0/90 | Unidirectional |
| 7 | Face | −45/+45 | Unidirectional |
| 8 | Face | 0/−45/+45/90 | Unidirectional |
| 9 | Face-Sole | +45/−45 | Unidirectional |
| 10 | Sole | 0/−45/+45/0 | Unidirectional |
| 11 | Face-Crown | 90/0 | Unidirectional |
| 12 | Face-Crown | +45/−45 | Unidirectional |
| 13 | Face | 0/−45/+45/90 | Unidirectional |
| 14 | Face-Sole | −45/+45 | Unidirectional |
| 15 | Face-Crown | 90/0 | Unidirectional |
| 16 | Face-Sole | +45/−45 | Unidirectional |
| 17 | Face | 0//0/0/0 | Unidirectional |
| 18 | Face-Crown | 90/0 | Unidirectional |
| 19 | Face | +45/−45 | Cloth |
| 20 | Crown | +45/−45 | Cloth |
| 21 | Sole | +45/−45 | Cloth |
| 22 | Face-Crown | Random | Random Mat |
| 23 | Face | Random | Random Mat |
| 25 | Sole-Side | Random | Random Mat |

While the use of pre-impregnated carbon fiber is preferred, the invention may also be practiced by wrapping the foam mandrel core 101 with layers of fiber, and impregnating the fibers with resin before or after placement in the mold 133.

After the plies have been wrapped around the bladder 111 and the therein contained core 101 and inflation fitting 104, the assembly 131 is placed into a female mold 133. The bladder 111 is connected through its inflation fitting 104 to a pressurization line 144 by any suitable method, and the mold 133 is closed. The bladder 111 is inflated and pressurized to press the plies against the female mold 133, and the mold heated to cure the resin. The internal pressure of the bladder 111 is used to apply the compaction pressure of the fiber composite materials against the female tooling. Accordingly, the core 101 at this point has no further function. The interior molding surface of the female tooling 133 forms and defines the contours of the outer surfaces of the club head.

For visual appearance, an outer layer of fibers 145 may be placed around the wrapped core assembly 131 or in the female mold 133 before placement of the assembly into the mold 133. This outer layer then forms the outer layer of the club head and provides surface appearance. Preferably this outer layer is a cosmetically appealing material such as woven carbon fiber material. Outer structural or non-structural layers may also be placed in the mold, before or after placement of the core/bladder/prepreg assembly 131 in mold, rather than wrapping the plies around the core/bladder/fiber assembly 131.

Figure 11:
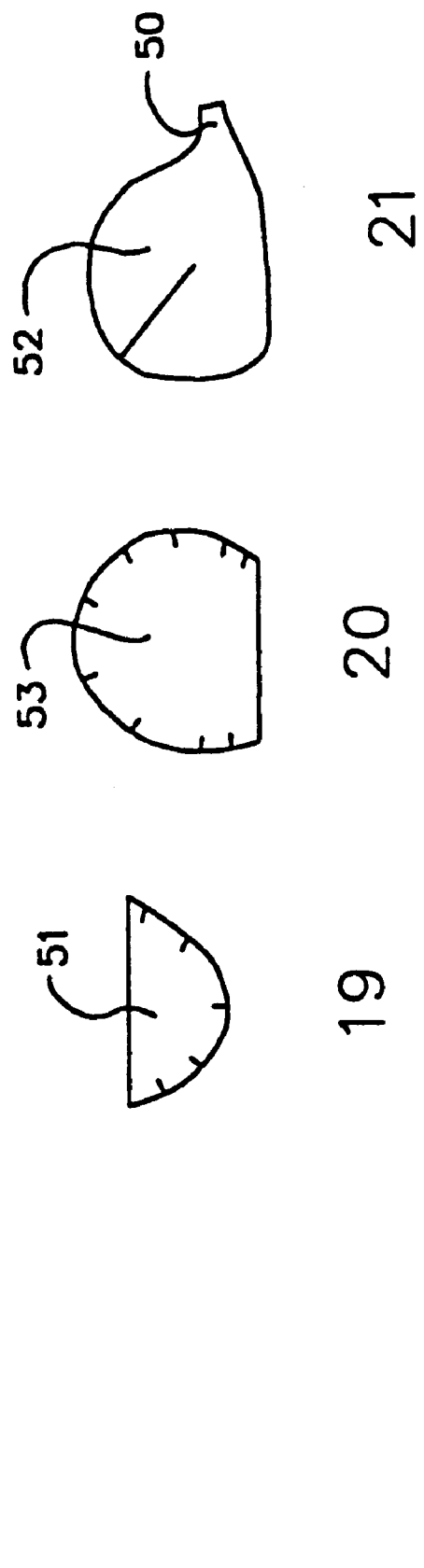
FIG. 11 is a plan view of a set of tool prepreg plies which may be used in the manufacture of a club head by the process of the invention.

FIG. 11, and items 19 to 21 illustrate a set of fiber plies to form the outer surface of the club head. All have a +45/−45 fiber orientation in the form of a woven cloth. Ply 19 covers the face. Ply 20 covers the crown. Ply 21 covers the sole. In the illustrated embodiment, plies 19 and 20 are placed on the assembly and ply number 21 is placed in the tool. Suitable woven cloth material is available from Ciba Composites, 5115 East La Palma Ave., Anaheim, Calif. 92807.

The bladder 111 is pressurized with a fluid, gas or liquid, preferably air, with a suitable pressure source located outside of the mold 133. Thus, application of pressure to the composite during cure is not dependent upon expansion of a foaming core material or the any strength properties of the core. The core 101 in the present invention serves essentially as a mandrel for the initial lay-up of the prepreg plies and has no function once the molding starts. Because of dimensions of the mandrel core 101, the fiber plies before the molding step approximate the shape of the final part, so movement of the plies during inflation of the bladder 111 is minimized.

The timing of the pressure application 201, the amount of pressure, and timing and extent of the heating of the mold to curing temperature 200 can be optimized by suitable process controllers to produce the desired results. The composite should be fully expanded by the inflatable bladder 111 to the mold walls to form a well compacted high-fiber-content, low-void-content laminate. The pressure may be cycled, or pulsed 202 to produce this result.

The bladder pressure 201 is generally between 200 to 250 psig. However, higher and lower pressures may be used to fit design requirements, and the equipment design limitations. The mold is heated to the temperature 200 required to cure the resin being used.

In order to remove air from the mold 133 that may cause voids in the final part, a vacuum 203 is preferably applied to the mold cavity via a special port in the tool before and during the time the bladder 111 is inflated and the mold 133 is heated. A vacuum seal is obtained by use of an "O"-ring inside a mold "O"-ring vacuum groove 146. To assist in the evacuation of air trapped in the wrapped bladder/core 131, porous materials 129 may be placed between carbon fiber prepreg layers to provide flow paths for air within the wrapped assembly 131 to the vacuum port 150 in the mold. These porous materials 129 can be placed between the layers, e.g., under the last layer placed over the core/bladder assembly 131, or over the last structural plies over the core and under the outer-surface decorative plies 145. The mold is preferably provided with a separate vacuum port 150, with the shape and orientation of the porous material 129 designed to assist passage of gas to the vacuum port from distal areas of the part. The porous material may be any suitable material, preferably one that can be incorporated into the molded part with little or no effect on physical properties or cosmetic appearance, such as an unimpregnated carbon fiber felt material 129. In FIG. 5, and items 22 to 24 in Table I, is illustrated a set of carbon fiber random mats 129 to be used with the plies shown in FIGS. 4 and 11. The label 53 designates portions of the plies that correspond to the crown or top of the finished head 206. Suitable random mat 129 material is available from Fiberite Inc., 2055 E. Technology Cir., Tempe, Ariz. 85284.

Figure 6:
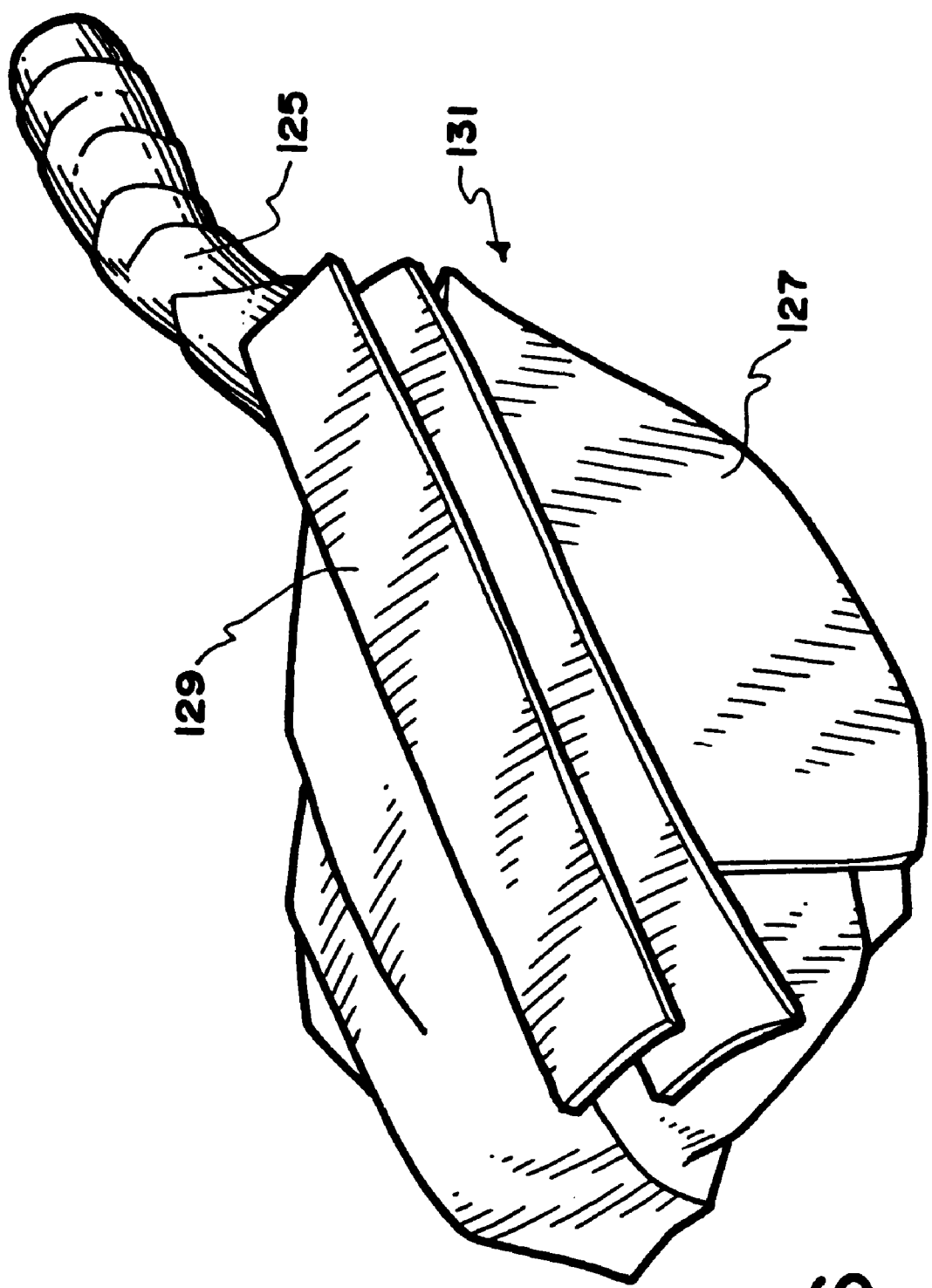
FIG. 6. is a perspective view of a bladder/core assembly as in FIG. 3 wrapped with plies as in FIGS. 4 and with mats as in FIG. 5.

Referring specifically to FIG. 6, which shows a core/bladder assembly 125 wrapped in prepreg plies 127. Unimpregnated carbon felt mats 129 are placed over the plies. It has been found that in some instances the dry fiber mat material 129 is not needed for removal of entrapped air, such as if the mold contains features to allow resin flow in critical corner areas. In one particular case a small channel or groove, about 0.020" deep and 0.020" wide, was added to vent the mold part cavity at the club head face to club head crown location, to provide a path for resin flow towards the vacuum port 150.

Figure 7:
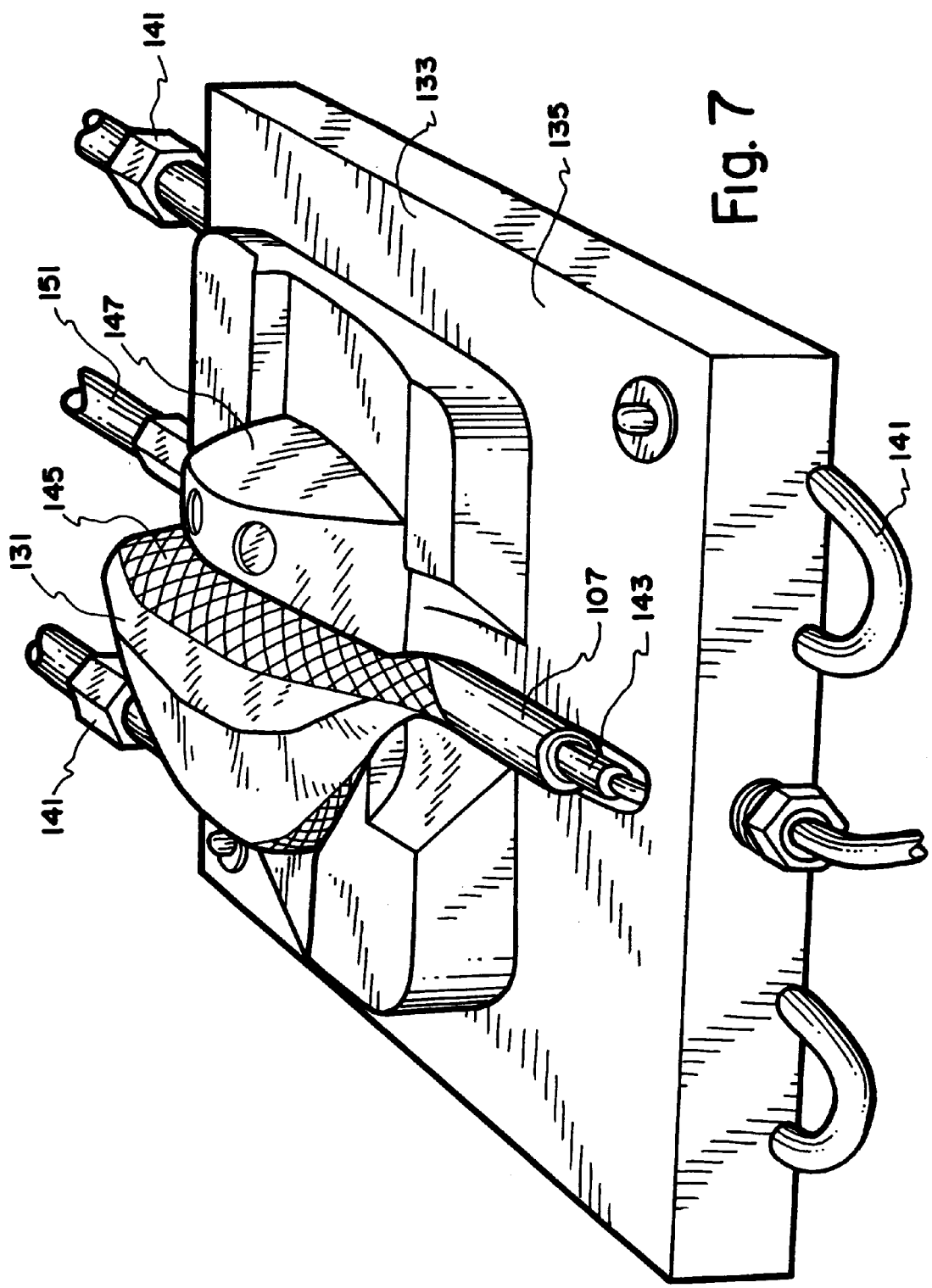
FIG. 7 is a perspective view of a top half of the female mold in which the wrapped assembly in FIG. 6 is placed for the molding process.
Figure 8:
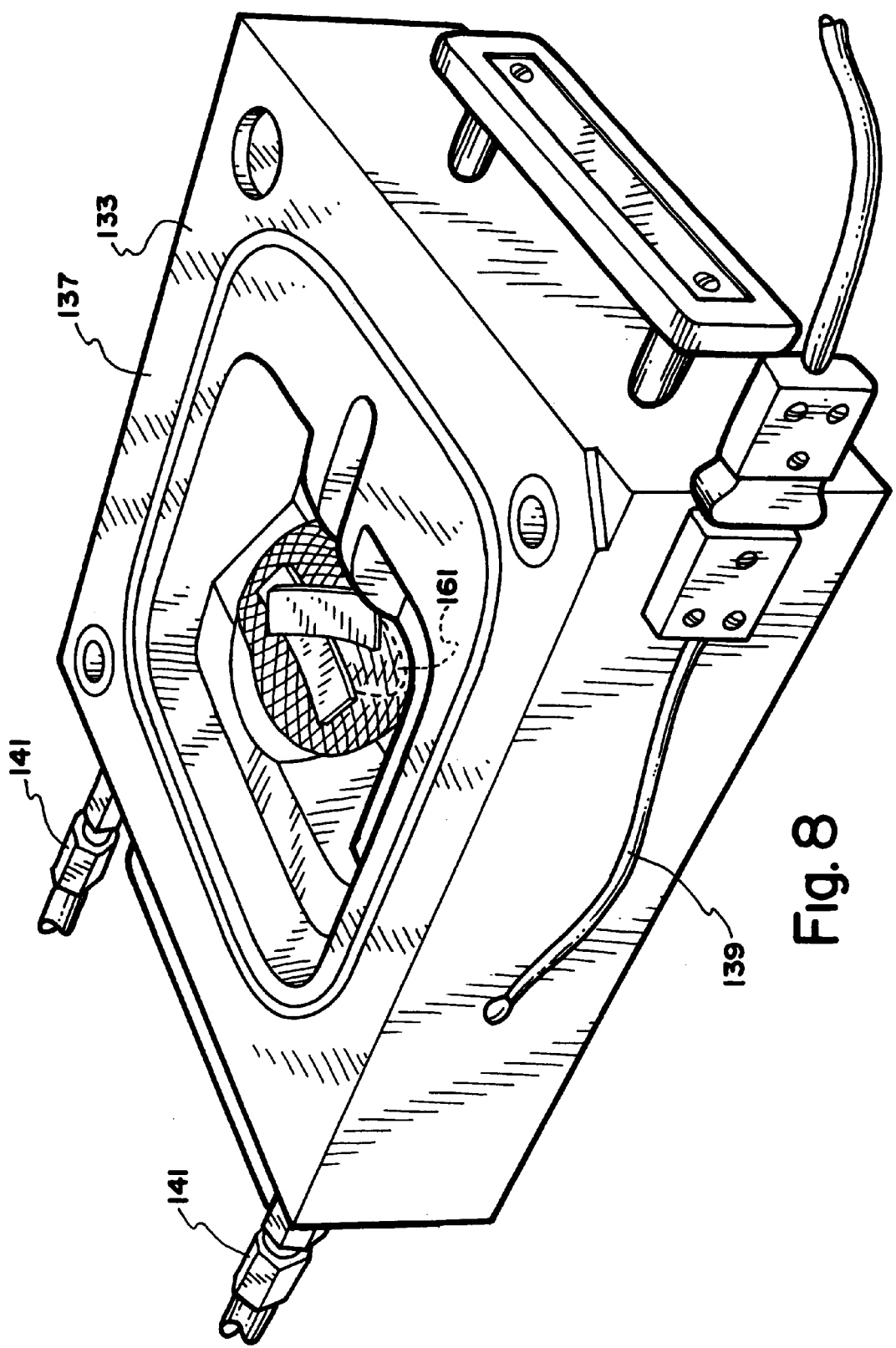
FIG. 8 shows the bottom half a female mold to match the top mold half in FIG. 7.

Referring to FIG. 7 and FIG. 8, the wrapped assembly 131 of FIG. 6 along with the tool prepreg plies 145 shown in FIG. 11 plies 19 and 20, is placed into a top half 135 of a female mold 133. The bottom half 137 of the mold is shown in FIG. 8 with the remaining tool prepreg ply shown in FIG. 11 as ply 21, the random mats 129 and the additional weight 161 shown in phantom. These tool prepreg plies 145 are usually a woven prepreg cloth and function mainly to provide a pleasing appearance to the outer surface of the final molded part. The mold 133 includes a thermocouple connections 139 for controlling heating of the mold to cure temperatures, and cooling lines 141 for passage of cooling water to cool the mold. A tubular barbed fitting 143 for insertion into the tubular silicon member 107 of the completed inflation fitting 104 is also provided. The mold match pins 134 provide precise alignment of the top 135 and bottom 137 mold halves. The handle 136 allows mold handling.

The completed inflation fitting 104 is attached to an inflation line 144 by means of the barbed fitting 143. The removable mold insert 147 which forms the club head face is also attached. This insert 147 may be required to ease removal of the molded part from the mold, depending upon the complexity of the shape of the molded part. The mold insert 147 is mainly needed if the grooves on the face of the club are molded in. Another alternative, which is preferable in some ways, is to route the grooves on the face after the club head has been molded. If the grooves are not molded, then the third mold piece is not needed.

The core 101 is dimensioned such that the wrapped core/bladder assembly 131 is dimensioned smaller than the inner dimensions of the mold 133, compensating for any fiber layers or other inserts placed in the mold before the wrapped core/bladder assembly. The core 101 dimensions should allow the mold 133 to be closed without fibers from the wrapped assembly being caught between sections of the mold and extruded outside of the part cavity during molding. The core 101 dimensions are preferably as large a practical, in order to permit a minimum of movement of the composite when the bladder 111 is inflated. This is to discourage wrinkling or off-axis movement of any fibers in the plies. In an exemplary application, the core outer dimension are between about 65% and 85% of the inside dimensions of the female mold cavity (or of the final molded part).

Figure 9:
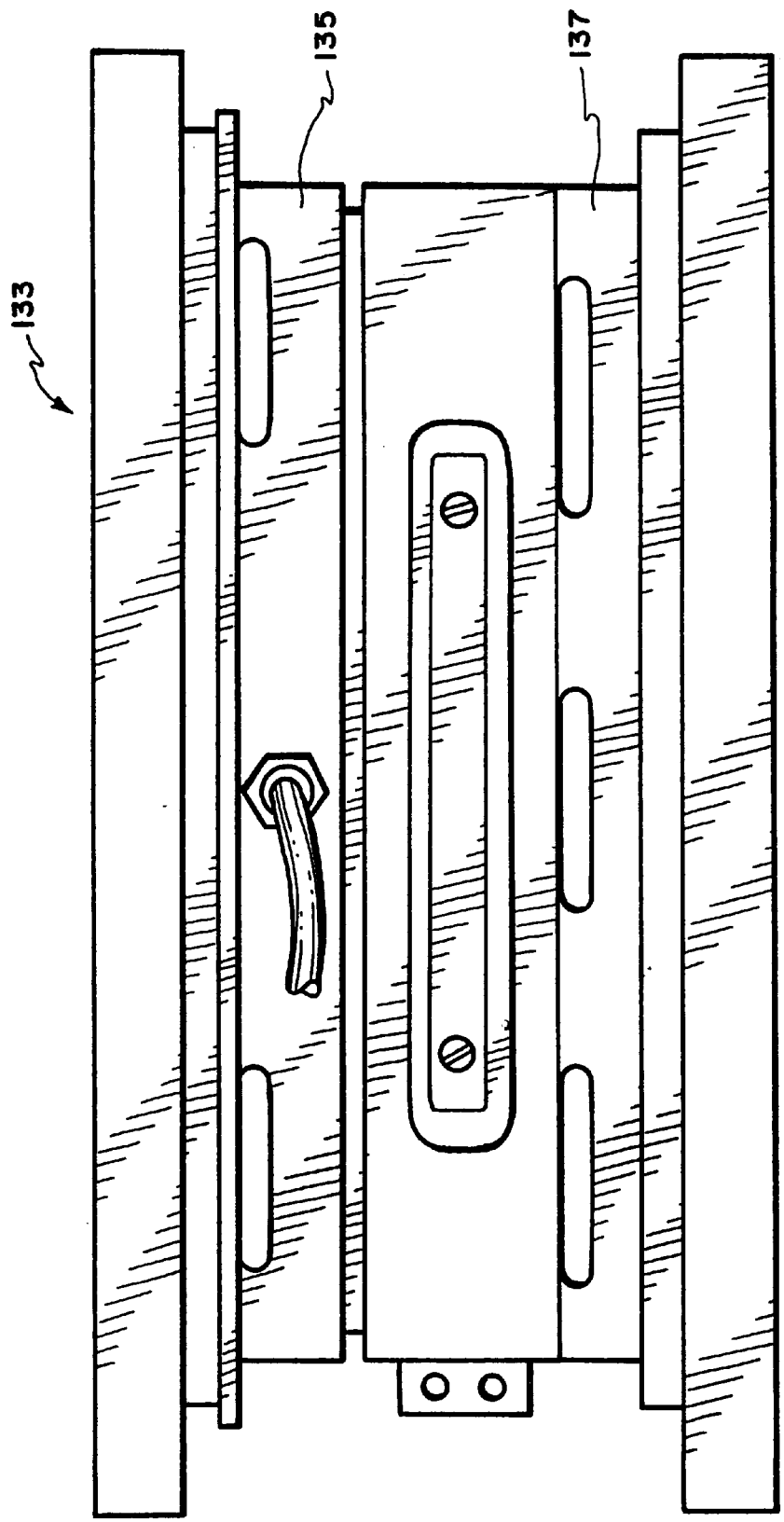
FIG. 9 is a schematic view of a closed mold sandwiched between the heating platens.

FIG. 9 shows the bottom and top of the mold 133 together press molding heating platens 132 and platen insulation 138. The mold 133 is placed in a suitable press and connected to suitable lines for vacuum 150, pressurization 144, cooling 141. The press provides clamping force to the mold to maintain the mold 133 closed against the internal molding pressure 201, 202 of the bladder 111. Mold heating platens 132 are mounted in the press along with the platen insulation 138. Before the curing of the part is begun, a vacuum is drawn on the cavity through vacuum line 150.

Figure 12:
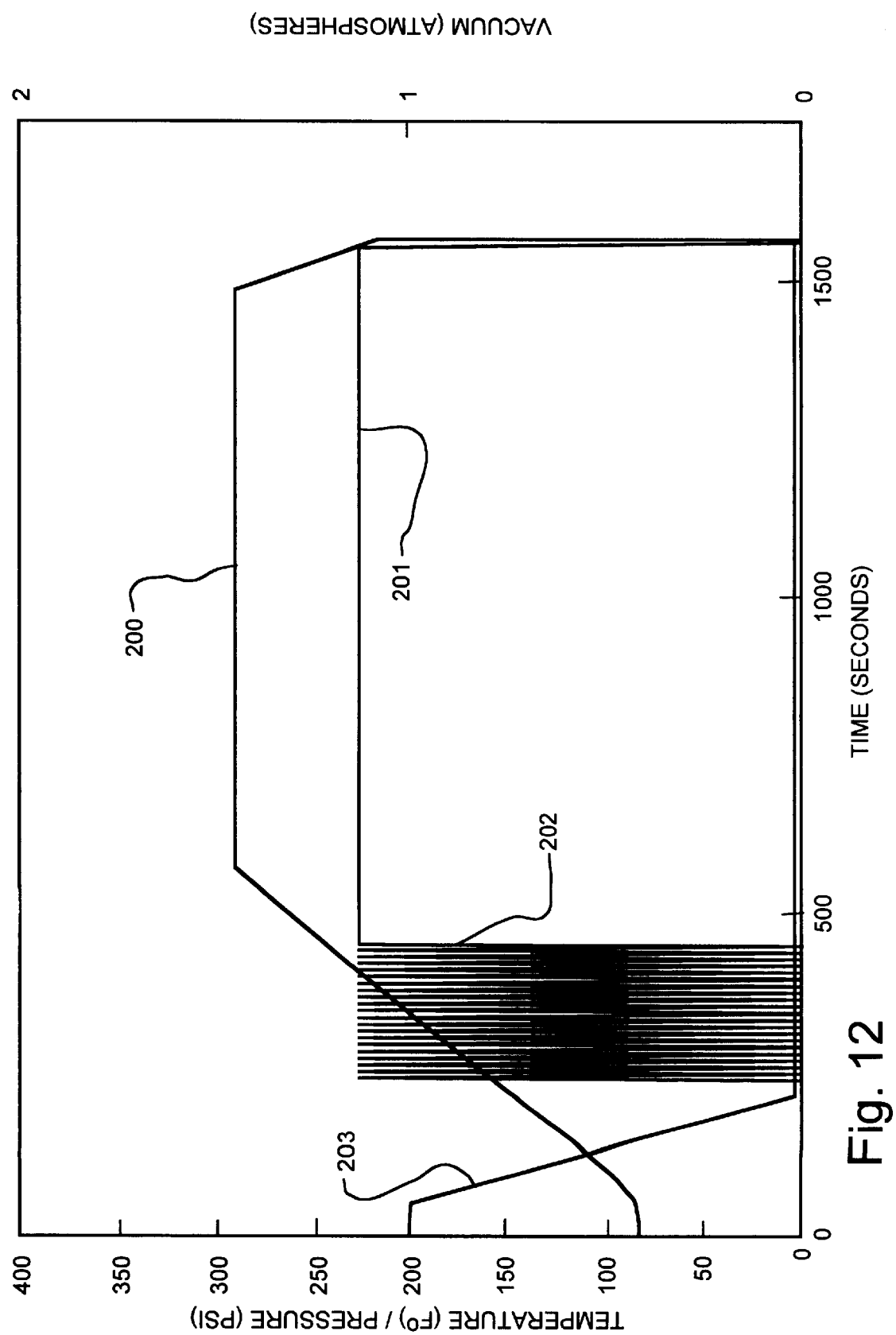
FIG. 12 is a graph showing the process condition during molding of a club head.

FIG. 12 is a graph showing the process condition during a molding cycle. The line 201 shows the bladder pressure during molding. The line 202 shows the segment of the cure cycle where the bladder pressure is pulsed. Line 200 shows the temperature of the mold in degrees Fahrenheit. Line 203 is the vacuum being drawn on the tool mold cavity, shown in atmospheres. In the example the bladder pressure 202 was pulsed between 0 and 250 psig to hammer the prepreg plies into conformation with the female tooling.

Cure cycles have been successfully used where the mold temperature is held constant at the full cure temperature. The mold 133 is continuously heated to its set full cure temperature, typically 300 Fahrenheit. The uncured fiber resin club head containing the bladder/core/fitting 125 is placed in hot mold, the bladder inflation fitting 104 is connected to the barbed fitting 143 in the mold, the mold is closed and the bladder pulsing starts immediately. The mold 133 is not cooled at all after cure, it is just removed from the clamping press and opened. The cured club head is removed from the mold while the mold is still hot. The mold cleaning operation, and mold release operations are also performed on the hot mold. This cure cycle reduces the molding time considerably.

Figure 14:
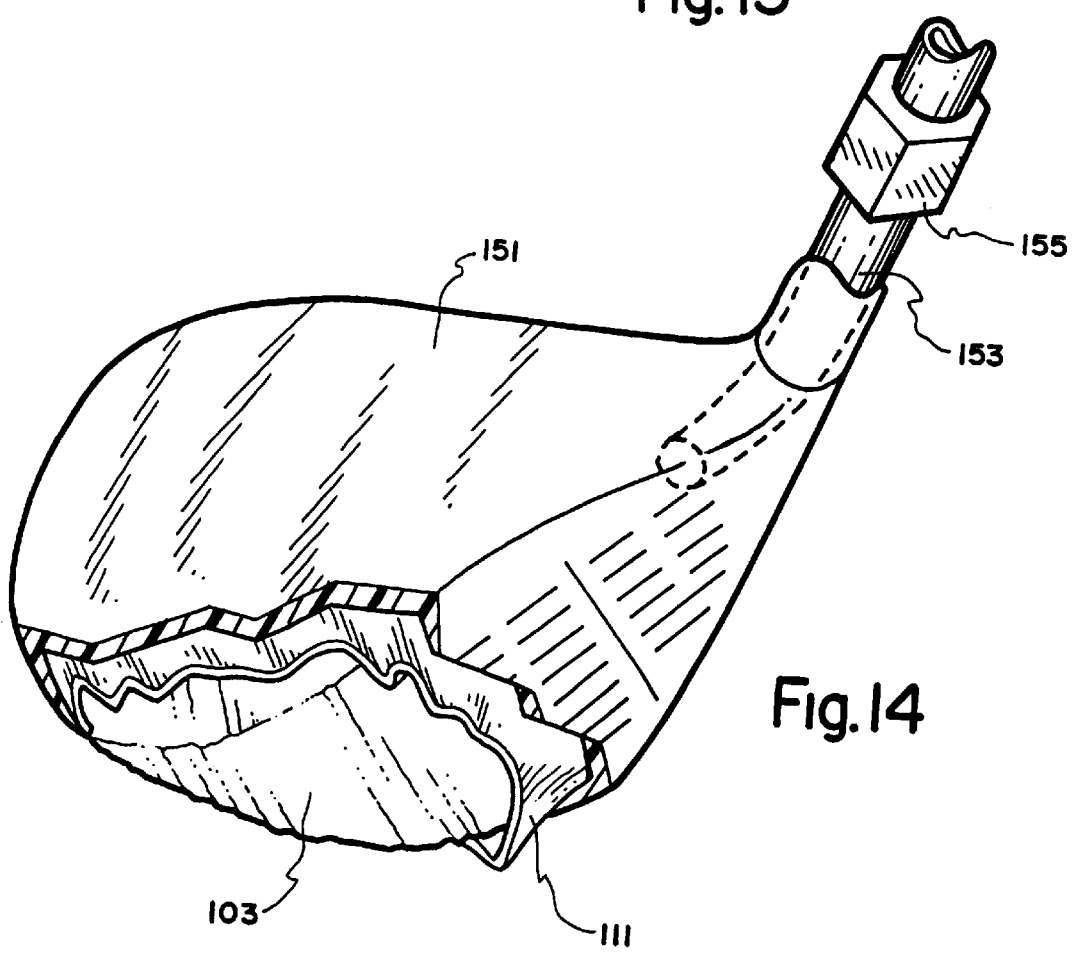
FIG. 14 is a perspective view of the molded article in partial cross-section, with a soluble core and the bladder in the interior and the fitting used to introduce solvent to dissolve and flush out the core material.

After the resin is cured, the bladder 111 is depressurized, the part removed from the mold 133, and the inflation fitting 104 is removed from the part. It is not desirable to leave the bladder 111 and core 101 within the molded club head, so both are removed after molding. The core 101 is removed by injecting water into the bladder to dissolve it. As shown in FIG. 14, a water injection fitting 205 may be inserted through the opening in the bladder left after removal of the inflation fitting 104. The water may be heated or contain suitable additives, dispersants, or the like, to assist in dissolving and dispersing the core material. Any liquid or gaseous material, such as a solvent or a reactive material that causes disintegration of the solid core by, for example, by solvation, chemical reaction, or the like, sufficient to allow removal of the bladder is contemplated by the invention.

Figure 15:
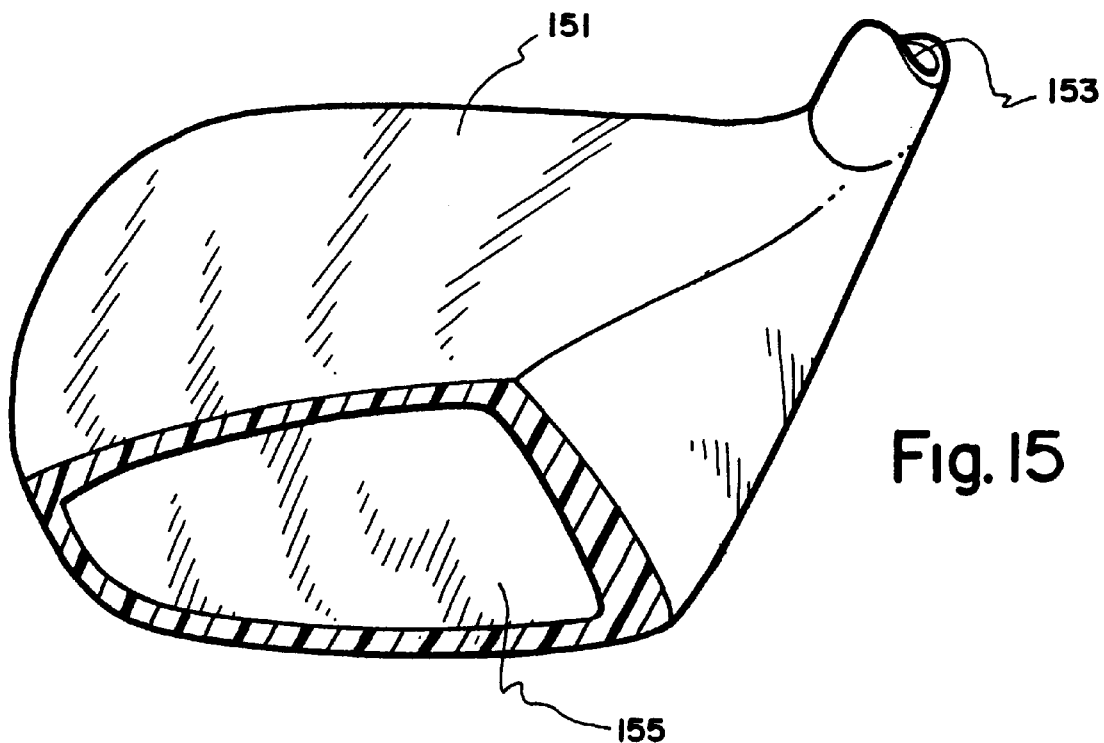
FIG. 15 is a cross-sectional view of a molded article with the soluble core and inflatable bladder removed.
Figure 16:
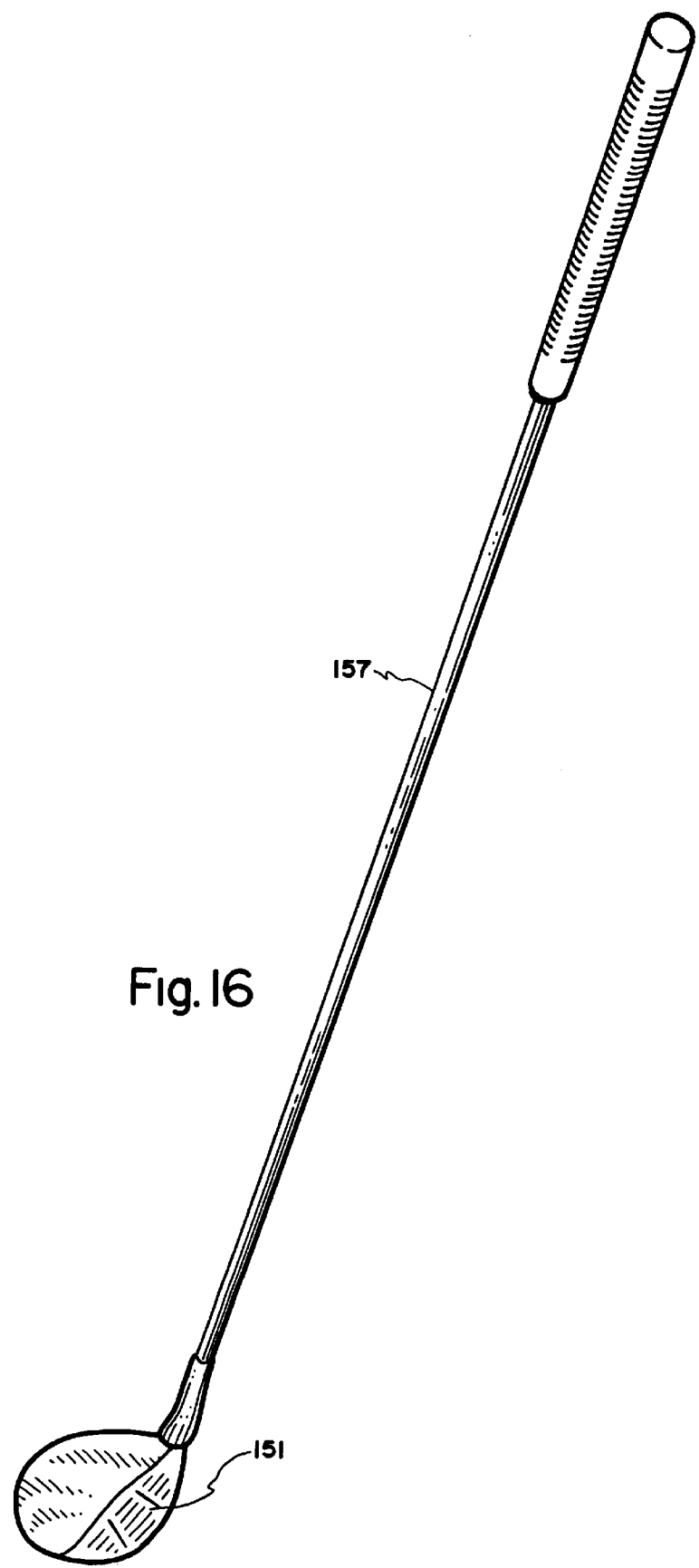
FIG. 16 is a perspective view of club head manufactured according to the process of the invention mounted on a golf-club shaft.

After the core 101 is removed by dissolving, the bladder 111 is easily removed by pulling it out through the hole 153 through which the inflation fitting extended 104. If the bladder is of a water-soluble material, it may also be fully or partially dissolved when the core is removed. As shown in FIG. 15, the final molded part 151 is generally hollow with at least one opening or hole through which the bladder opened and the inflation fitting originally extended. This would typically be the upper hosel hole 153 in the club head. The shape may also have additional openings if desired. Since the final shape is a golf club head, the shape is preferably configured such that the opening corresponds to the opening of the hosel 153 for attachment of a golf-club shaft 157 as shown in FIG. 16. The club head interior 155 is essentially free of any of the molding materials, e.g., core 101 or core residues, and the bladder 111 or bladder residues. The only remaining components of the final club head are structural elements, i.e., the reinforced fiber composite, and any inserts, such as weights, plates and the like, that have function in the final molded part. There are essentially no materials that are remnants of the molding process and have no function in the final club head, but often add undesirable weight to the club head.

Figure 13:
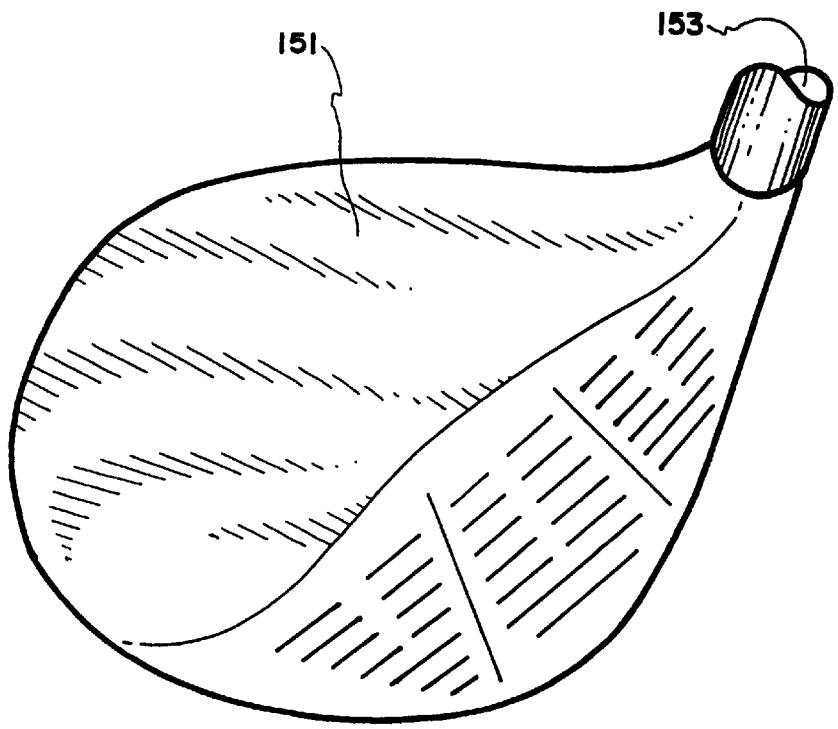
FIG. 13 is a perspective view of the molded club head article after removal from the mold and removal of the bladder, core and inflation fitting.

Referring to FIG. 13, which shows the molded part 151 in the form a golf-club head after it is removed from the mold and the inflation fitting 104 that extended from the hosel hole 153 is removed.

Referring to FIG. 14, the molded part 151 is shown in partial cross-section showing the core 101 and the bladder 111 remaining in the interior. A water injection fitting has been inserted through the hole so that pressurized water can be injected into the interior. The water dissolves the core, and the bladder is pulled out through the hole 153. The result, shown in cross-section in FIG. 15, is a molded part with a hollow interior 155 that is free of the bladder or any of the materials used for molding the part. The molded part 151 may then be mounted upon a golf club shaft 157 by any suitable manner as shown in FIG. 16.

Figure 10:
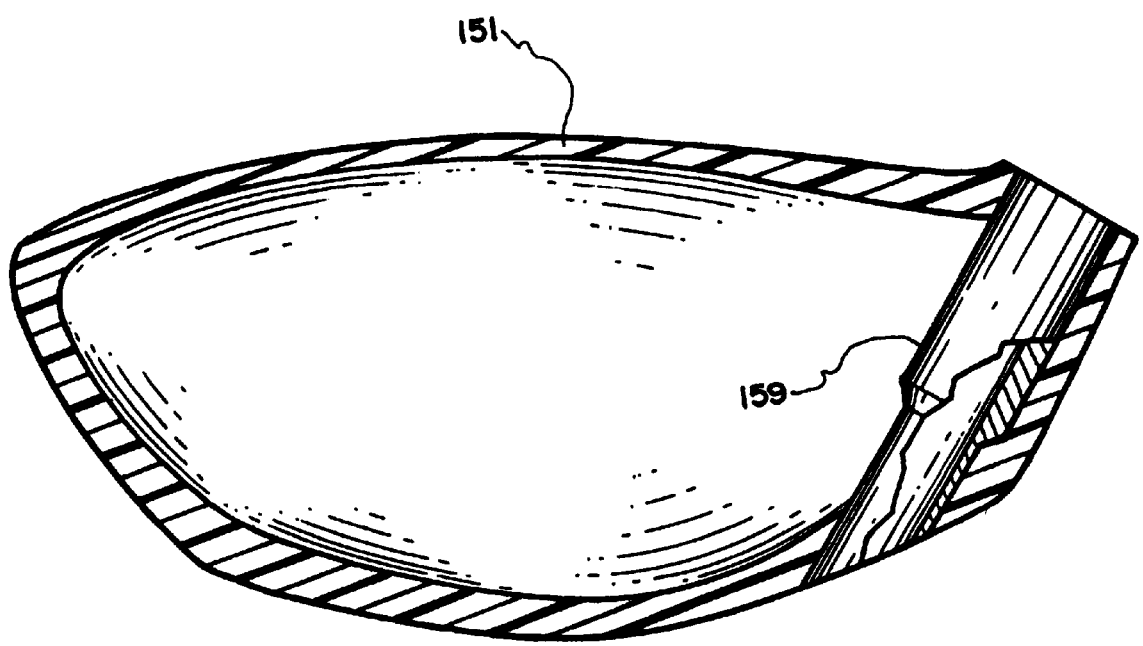
FIG. 10 is a cross-sectional view of a molded article showing in phantom a reinforcing tube for shaft bonding.

Referring to Figure 10, which shows a molded club head 151. Shown in phantom is an optional interior club head shaft attachment sleeve 159 that is inserted through the upper hosel hole 153 and aligned with a bottom hosel hole 163 in the sole. The sleeve 159 is bonded into the finished and trimmed club head 206. The sleeve 159 is dimensioned and aligned for receiving the golf club shaft 157. The golf club shaft, which may be any suitable material such as metal or fiber composite, is bonded to the head by any suitable process.

The final molded and trimmed part 206 may also include inserts or implants that are incorporated into the part during the curing. These may include face plates, tubular members for receiving a shaft, weights, etc. The inserts may be uncured, partially cured, or cured composite materials, metals, or any other materials compatible with the molding process, and able to bond or be held in the cured fiber reinforced resin. As an example, a partially cured or uncured resin mixed with a metal powder may be placed into the mold with the wrapped shape, or placed between plies of the prepreg. The insert and the plies are then co-cured together to form an integral part. The part may also include molded holes, ridges, or other shapes for mounting of face-plates, labels, and the like.

Figure 17:
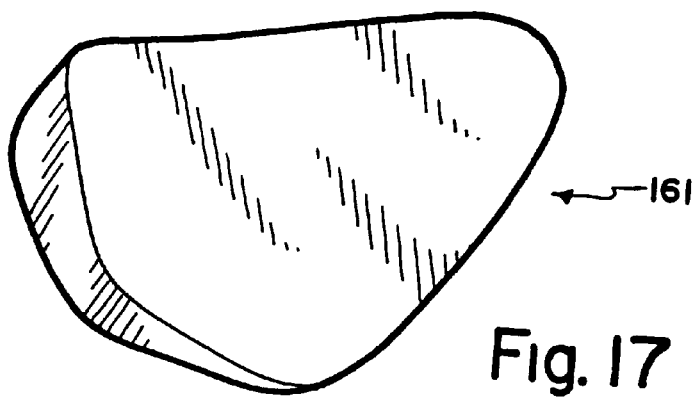
FIG. 17 is a perspective view of an optional weight that may be placed in the mold with the wrapped assembly to become an integral part of the final cured club head.

Referring to FIGS. 8 and 17, an insert 161 is placed in the bottom mold 137 as shown in phantom in FIG. 8, before the mold is closed. In the illustration, the insert is a weight 161 that will be positioned in the sole of the female mold. The insert may be any suitable weighting material that can become incorporated into the cured part. The insert may alternately be place between or under prepreg plies. The insert illustrated is a metal powder, tungsten, in a cured thermosetting matrix. FIG. 17 is a detail view of the insert 161. The metal powder imparts the weight and a pleasing appearance to the surface of the insert 161, as it will be at the outer surface of the club head. Tungsten is preferred because of its density, but other powders may be used to vary the mass and appearance of the insert, such as copper, brass, or mixture or the same.

Optionally, stainless steel shells have been investment cast, generally covering the sole area, or perhaps the sole and club head face. These inserts can then be placed amongst the prepreg plies during lay up, and become an integral part of the club head, adding weight where needed, and also beneficially influencing the aural qualities of the club head experienced shortly after ball impact.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

Interleaved Construction of Club Head

The club heads of the present invention are made without seams in the form of lap joints in the part. The golf-club heads are essentially seamless, which means that plies of reinforcing carbon fiber from different portions of the part are interleaved. In one sense this means that edges of several adjacent plies do not necessarily terminate together. By interleaving the plies, there is no seam line in the part, i.e., no short path through the part wall across which carbon fibers do not pass. While not desired, there may be locations in the part in which edges of adjacent plies incidentally or intentionally terminate together. However, it is desired to design the shape the preformed carbon fiber plies to avoid such instances, in order maximize the amount of reinforcing fiber at each point in the part.

In another sense, "seamless" can be described in terms of the length of the shortest path that passes along any plane through the part and passes from the interior of the part to the exterior, without passing through any carbon fiber plies. In a lapped joint, the path often extends about 0.25 to 0.375 inches along the length of the lap in generally the same direction. The interleave ratio, the length of the path to the average thickness of the overlapping layers or plies, is typically about 5 to 15. The interleave ratio is an indication of the strength of a joint. The shortness of the overlap and the thick layers with multiple plies result in a low interleave ratio.

In contrast, in the golf-clubs of the present invention the path through the part is convoluted and doubles back several times in an opposite direction. In addition, the average thickness of overlapping ply layers, which are usually only one or two plies thick, is small. The result is an interleave ratio that is significantly higher than for the lapped joints of the prior art, i.e., greater than about 30, but more typically 100 or more.

The interleave ratio is further illustrated by reference to FIGS. 18 and 18A. FIG. 18 is a cross-section of composite shell a part 513, such as a golf-club head, with the thickness exaggerated for illustration purposes, and FIG. 18A is a detail from FIG. 18 showing the path through the wall of the part. In FIG. 18, the composite shell 513 comprises several layers or plies of laminate 514. In FIG. 18, only some of the plies are shown for illustration purposes.

Referring to FIG. 18, the interleave ratio for a wall of the composite shell 103, which in constructed of multiple plies, is defined as the path length of the shortest line or path through the laminate 515 which does not pass through a ply of fibrous material, divided by the average wall thickness of the laminate in the area of the interleave path. By definition, the shortest path through the laminate 515 cannot traverse any fibrous material contained in a ply, and therefore the path must generally follow the spaces between the plies, or laminations, until it reaches the ends of such plies where it can "go around" the ends of such plies. The laminate 514 in FIG. 18 is shown separated to more clearly illustrate the path through the laminate, which starts at 516 and ends at 517. FIG. 18A shows the path without the laminate to more clearly show the convoluted nature of the path. For this specific example, the path length of the shortest line 515 in the view of FIG. 17 is 20.72 inches. The average wall thickness in the view of FIG. 18 for this area of the laminate is about 0.099 inches. This is the average of 0.113 inches (at 521) and 0.085 inches (at 519) since the wall thickness varies in this instance. The interleave ratio for this example is then 20.72 inches divided by 0.099 inches, which is 209.7. The interleave ratio for this example is therefore approximately 210.

Figure 19:
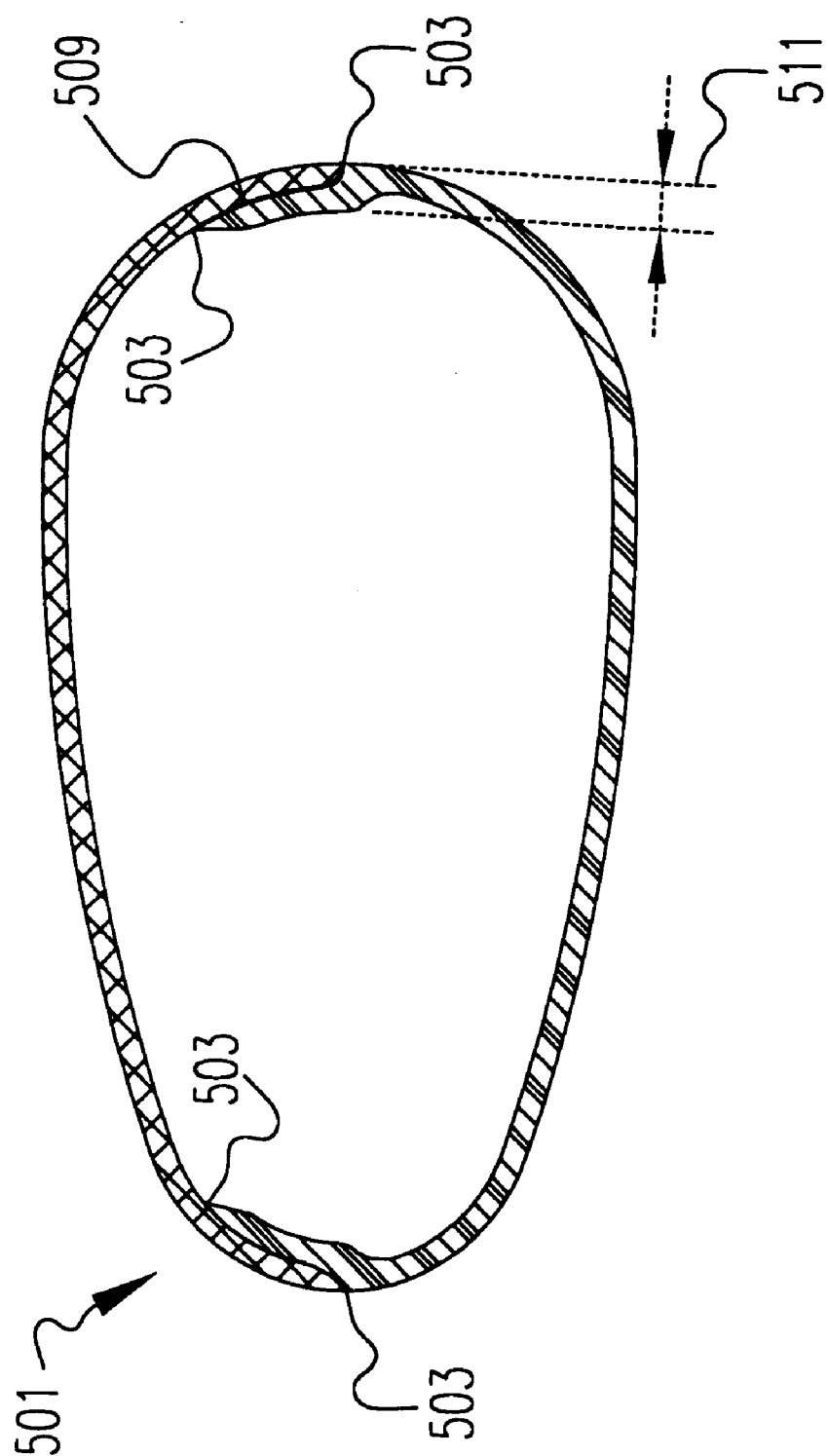
FIG. 19 is a schematic cross-section of a lapped or jointed prior-art part showing the low interleave ratio at the joint.

The interleave ratio calculated in FIGS. 18 and 18A for the present invention can be compared with the interleave ratio typically obtained in prior art constructions by referring to FIG. 19. FIG. 19 shows a cross-section of prior-art part 501, such as a golf-club head, with a lapped joint 509. For this example, 503 in FIG. 19 is 0.448 inch. The average wall thickness for this area of the laminate is 0.163 inch (at 511). The wall thickness, in this example, is essentially constant in the area of the interleave path. The interleave ratio for this example is then 0.448 inch divided by 0.163 inch, which is 2.75. The interleave ratio for this prior art example is therefore approximately 3, which is roughly a factor of 75 smaller that the illustration of the invention in FIGS. 18 and 18A.

BRIEF SUMMARY DESCRIPTION OF THE PROCESS STEPS

A summary of the steps for one of the preferred methods for producing golf club heads of this invention are listed below:

| Step | Description |
| --- | --- |
| 1. | Form a foam mandrel core which is used inside bladder for material arrangement process. |
| 2. | Form and seal a bladder around the mandrel core and attach a bladder inflation fitting to bladder to create the bladder/core/fitting assembly. |
| 3. | Place uncured fiber resin prepreg material on bladder/core/fitting assembly. |
| 4. | Place uncured fiber resin prepreg club head containing bladder/core/fitting assembly into a female mold defining the final outer contours of the club head. |
| 5. | Apply pressure into bladder to compact uncured fiber resin prepreg club head while applying vacuum in mold cavity to remove entrapped air and heating mold and club head to harden or cure the plastic resin. |
| 6. | Remove cured club head, which still contains the bladder/core/fitting assembly, from the female mold. |
| 7. | Remove the bladder inflation fitting from the bladder/core/fitting assembly. |
| 8. | Introduce water into bladder/core, which is still inside cured head, to wash out the foam mandrel core from inside the bladder. |
| 9. | Remove the bladder from inside the cured club head, by pulling it out of hosel hole (this is the top hosel hole, the only opening in the as molded club head). |
| 10. | Trim the excess cured composite material from around area where bladder enters club head (ie. the top hosel hole) and drill a hole through the club head top hosel hole creating a bonding surface for the interior shaft attachment, and also forming the bottom hosel hole. |
| 11. | Insert and bond the interior shaft attachment sleeve inside the cured club head. |
| 12. | Club head is now ready for bonding to golf shaft. |

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

The present invention is suitable for the manufacture of a wide range of hollow composite components. It is particularly well suited for complex three dimensional composite material structural components having at least one opening to allow use of the method of the invention using the bladder, to allow removal of the bladder from the part. The following parts may be suitably made by the process of the invention, bicycle frames, bicycle frame components such as lugs or tubes, bicycle components, such as handlebar stems, cranks, brake components, wheels, hubs forks, suspension forks, musical instruments such as guitars, violins, violin bows, cellos, basses, clarinet, trumpets, etc.

aircraft components, such as flaps, spoilers, ailerons, seat frames, window frames, access doors, etc.

automobile components, such as seat frames, suspension components (link arms, etc.)

complex, multiply curved, three dimensional shapes, hollow thin walled shapes where having more than one or two plies terminating at any one location would be detrimental. The method is particularly suitable to eliminate the gross fiber discontinuity, for example between two symmetric part halves which occurs in some prior art applications of bladder molding composites, parts with multiple hollow cells connected by small openings, such as aircraft control surfaces with shear ribs and panels breaking up longer torsion boxes.

What is claimed is:

1. A composite golf club head comprising:

a face;

a crown;

a sole;

each of said face, crown, and sole with junctures between said face, crown and sole forming a wall of said club head; each said wall comprising a predetermined number of pre-formed multiple interleaved plies of reinforcing fibers; the multiple plies being essentially free of wrinkles;

said composite club head being assembled such that said predetermined number of multiple interleaved plies of said face, crown, and sole are overlapping at the junctures between the face and sole and between the face and crown; the junctures providing a substantially seamless construction between the walls;

said walls having an interleave ratio greater than about 30;

said hollow composite club head having an interior essentially free of molding-assist byproducts.

2. The club head of claim 1, wherein the interleave ratio is greater than about 100.

\* \* \* \* \*